US007278098B1

(12) United States Patent
Boye et al.

(10) Patent No.: US 7,278,098 B1
(45) Date of Patent: Oct. 2, 2007

(54) METHOD AND APPARATUS FOR IMPLEMENTING WEB PAGES HAVING SMART TABLES

(75) Inventors: Steven R. Boye, Palo Alto, CA (US); Rajagopal Lakshminarayan, Atlanta, GA (US); Michael R. Shumann, San Francisco, CA (US); Bernard Desarnauts, Menlo Park, CA (US); Marc E. Escobosa, Piedmont, CA (US); Victor B. Zauderer, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 559 days.

(21) Appl. No.: 08/827,634

(22) Filed: Apr. 9, 1997

(51) Int. Cl.
*G06F 15/00* (2006.01)
*G06F 17/00* (2006.01)
(52) U.S. Cl. .................. 715/517; 715/501.1; 715/513
(58) Field of Classification Search ................ 345/342; 707/517, 513, 531, 525; 715/517, 513, 501.1, 715/525, 520–521
See application file for complete search history.

(56) References Cited

U.S. PATENT DOCUMENTS

| 5,555,362 | A | * | 9/1996 | Yamashita et al. | ........... 707/517 |
| 5,845,303 | A | * | 12/1998 | Templeman | ................. 707/515 |
| 5,897,644 | A | * | 4/1999 | Nielsen | ....................... 707/513 |
| 5,956,737 | A | * | 9/1999 | King et al. | ................... 707/517 |
| 6,161,114 | A | * | 12/2000 | King et al. | ................... 715/517 |
| 6,199,080 | B1 | * | 3/2001 | Nielsen | ...................... 707/513 |

OTHER PUBLICATIONS

Laura Lemay, Teach Yourself Web Page with HTML in a Week, p. 306, 348, 346, 1995.*
Borland, Quattro Pro for Windows User's Guide, p. 77, 121, 122, 129, 1992.*
Oliver, D. et al., Netscape 3 Unleashed, Sams.net Publishing pp. 408-413, 1996.*
Mohageg, Mike et al., A user interface for accessing 3D content on the World Wide Web, ACM Conference on Human Factors and Computing Systems, 1996, pp. 1-10.*
Branwyn, Gareth, Mosaic Quick Tour For MAC, 1994 Ventana Press, Inc. pp. 52-59.*
Heller et al., So you wanna design for the Web, interactions (ACM Press), vol. 3 Issue 2, Mar. 1996, pp. 19-23.*

* cited by examiner

*Primary Examiner*—William Bashore
(74) *Attorney, Agent, or Firm*—Fulbright & Jaworski LLP

(57) ABSTRACT

A method and apparatus that allows a user to specify whether his web page has primarily row or column layout. Web page editor software designed in accordance with the present invention generates the internal representation of a page (such as HTML) differently depending on how the user specifies the web page. A preferred embodiment of the present invention defaults to a primarily row layout, but allows the user to specify a primarily columnar layout by checking a box displayed by the editor. The editor generates an HTML table representing the page (or each frame of the page). Within the main HTML table, the editor generates HTML subtables, depending on whether the page is laid out using primarily row or column layout. The subtables are defined in such a way that the various elements of the page lined up in either a row or column direction, thus minimizing the problems. In addition, an editor in accordance with a preferred embodiment of the present invention allows the user to define whether the height of text is locked or whether it can be changed when viewed by a browser.

21 Claims, 31 Drawing Sheets

FIG. 4B
DRAW OBJECT FOR TEXT

LOCATION
ATTRIBUTES

LOCKED-SIZE FLAG

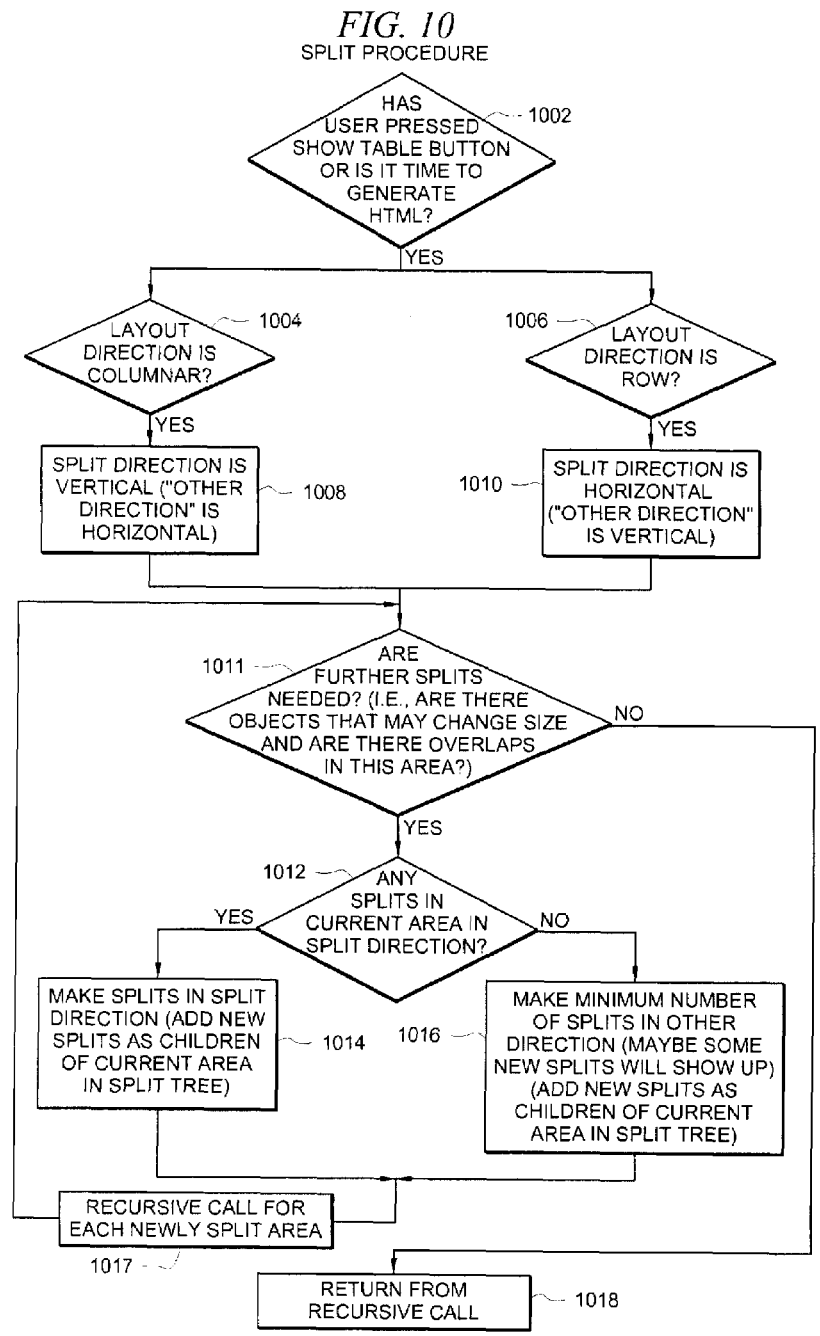

SPLITABLE

NON-SPLITABLE

SPLITDIRECTION = COLUMN

FIG. 13C
A NODE IN THE SPLIT TREE

- AREA OF PAGE CORRESPONDING TO THIS NODE
- OBJECT LIST FOR THIS AREA
- DIRECTION THIS NODE IS SPLIT IN (IF ANY)
- POINTER(S) TO CHILDREN (IF ANY)

CREATE INITIAL HTML

BUILD HTML SUBTABLE

*FIG. 21*

GENERATE FINAL HTML

2102

```
<p> <A HREF = netobjects homepage URL>
    <IMG SRC=link image\ BORDER=0>
    </A>
</P>
</BODY>
</HTML>
```

FIG. 22
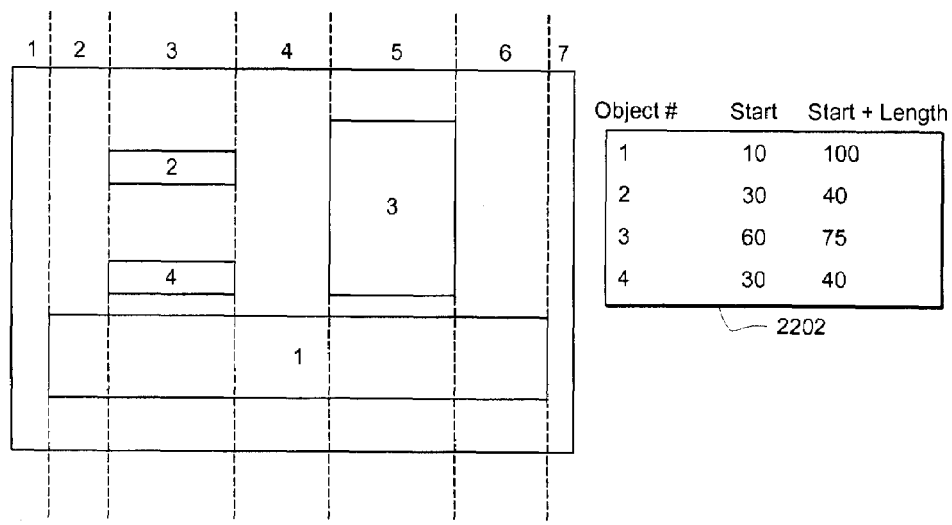
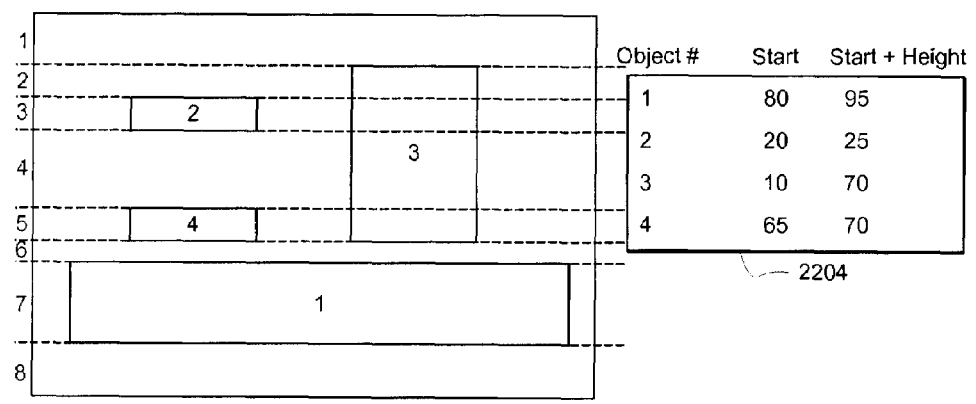

METHOD AND APPARATUS FOR IMPLEMENTING WEB PAGES HAVING SMART TABLES

RELATED APPLICATIONS

Each of these related applications are herein incorporated by reference.

1) U.S. application Ser. No. 08/687,974 of Arora et al., entitled "Draw Based Editor for Web Pages," filed Jul. 29, 1996, and
2) U.S. application Ser. No. 08/687,971 of Arora et al., entitled "Hierarchical Structure Editor for Web Sites," filed Jul. 29, 1996.
3) U.S. application Ser. No. 08/827,642 of Arora et al., entitled "Method and Apparatus for Implementing Web Pages Having Master Borders," filed Apr. 9, 1997, herewith.

FIELD OF THE INVENTION

This application relates to software for editing web pages and, specifically, to a method and apparatus that allows a user to specify whether a web page being defined has primarily a row or column layout.

BACKGROUND OF THE INVENTION

Recently, people have begun to automate the task of designing world wide web pages. Various software programs exist that allow people to define the appearance of a web page. Users on the world wide web can then view the defined page using browser software. In general, when viewed with a browser, the defined page will appear as it was defined. A problem develops, however, when certain types of web pages are displayed on certain hardware platforms or using certain browser options.

These problems are due, primarily to differences between hardware platforms and to the user changing various default browser options. As an example of hardware platform differences, 10 point text displayed in Microsoft Windows 95 is the same size as 10 point text on the Apple Macintosh. Thus, for example, if a block of text on a web page is defined to be 10 point type, it will take up less space on the screen of a browser running on a Macintosh than it will take up when displayed by a browser executing on an IBM PC.

As a further example, some browsers allow the user to set the size at which text is displayed in a web page. If the user sets the text to be larger or smaller than usual, this affects how much screen space is needed to display the text. As a further example, not all text fonts take up the same amount of room, even when they are technically the same type size. Because certain browsers allow the user to specify the font used to display text, the text of web pages displayed by the browser may take up more or less room than was intended by the human designer of the page.

Given the current state of browsers, the human designer of a web page has no control over how various browsers executing on different platforms will display text. Similarly, the human designer has no control over whether a user changes the size or the font of text on his web page. Thus, even though the human designer may carefully design the layout of his web page, the layout will not appear as planned under certain circumstances. What is needed is a way to let the human designer plan his page in such a way that the effects of the above problems are minimized.

SUMMARY OF THE INVENTION

A preferred embodiment of the present invention overcomes the problems and disadvantages of the prior art by allowing the user to specify whether his web page has primarily row or column layout. Web page editor software designed in accordance with the present invention generates the internal representation of a page (such as HTML) differently depending on how the user specifies the web page.

Specifically, a preferred embodiment of the present invention defaults to a primarily row layout, but allows the user to specify a primarily columnar layout by checking a box displayed by the editor. The editor generates an HTML table representing the page (or each frame of the page). Within the main HTML table, the editor generates HTML subtables, depending on whether the page is laid out using primarily row or column layout. The subtables are defined in such a way that the various elements of the page lined up in either a row or column direction, thus minimizing the problems.

An editor in accordance with a preferred embodiment of the present invention allows the user to define whether the height of text is locked or whether it can be changed when viewed by a browser.

In accordance with the purpose of the invention, as embodied and broadly described herein, the invention is a method for allowing a designer to specify whether a web page layout is primarily by rows or by columns, comprising the steps, performed by a data processing system, of: receiving input from the user specifying a layout of display elements on the web page; determining a primary split direction for the web page; determining needed splits in the primary split direction for the web page; and displaying the web page on a display screen, including indications of the locations of the determined splits.

In further accordance with the purpose of this invention, as embodied and broadly described herein, the invention is a method for allowing a designer to specify whether a web page layout is primarily by rows or by columns, comprising the steps, performed by a data processing system, of: receiving input from the user specifying a layout of display elements on the web page; determining a primary split direction for the web page; determining needed splits in the primary split direction for the web page; and generating an internal representation of the web page where the layout of the web page is primarily by rows or primarily by columns in accordance with the split determining step.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 4(b) is a example of a draw object for text.

FIG. 10 is a flow chart showing steps performed during the "split" procedure.

FIG. 13(c) shows a format of a node in the split tree.

FIG. 21 is an example of steps performed by the page editor to generate final HTML for a site.

FIG. 22 is an example of first steps involved in determining an HTML table size.

DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

System Overview

Figure 1:
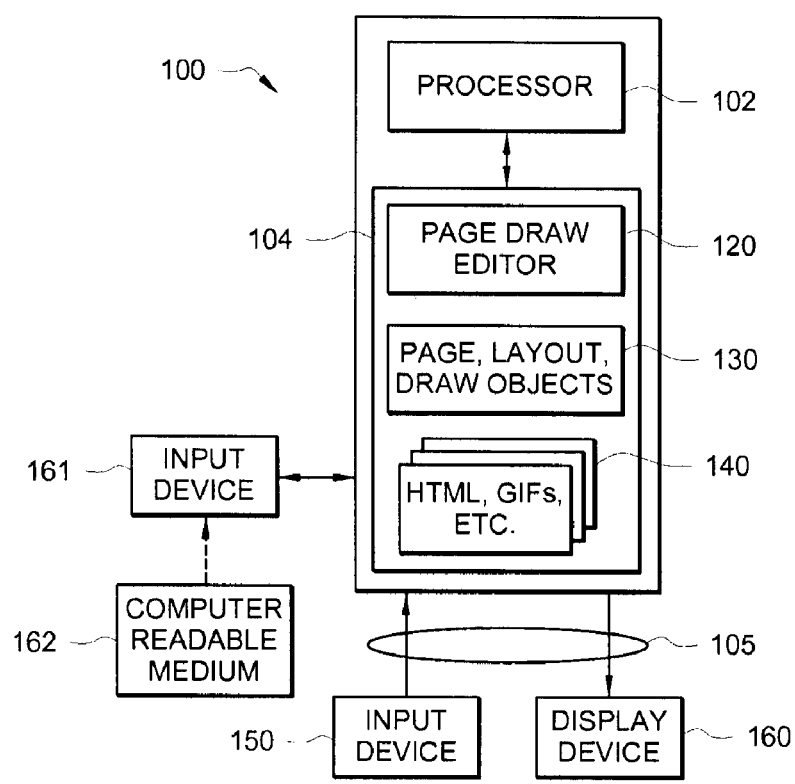
FIG. 1 is a block diagram of a computer system used in accordance with a preferred embodiment of the present invention.

FIG. 1 is a block diagram of a computer system 100 in accordance with a preferred embodiment of the present invention. Computer system 100 includes a CPU 102; a memory 104; input/output lines 105; an input device 150, such as a keyboard or mouse; and a display device 160, such as a display terminal. Computer 100 also includes an input device 161, such as a floppy disk drive or CD ROM reader, that reads computer instructions stored on computer readable medium 162, such as a floppy disk or a CD ROM. These computer instructions are the instructions of e.g., page draw editor software 120. Memory 104 includes page draw editor software 120 ("editor software"), draw objects 130, HTML 140, image files 140, etc., as described in further detail below.

A person of ordinary skill in the art will understand that memory 104 also contains additional information, such as application programs, operating systems, data, etc., which are not shown in the figure for the sake of clarity. It also will be understood that computer system 100 can also include numerous elements not shown in the figure for the sake of clarity, such as disk drives, keyboards, display devices, network connections, additional memory, additional CPUs, LANs, internet connections, input/output lines, etc.

In the following discussion, it will be understood that the steps of methods and flow charts discussed preferably are performed by processor 102 executing instructions stored in memory, such as instructions of editor software 120. Editor software 120 can be initially loaded into memory from computer readable medium 162. It will also be understood that, although the following paragraphs describe an implementation of the present invention using object-oriented programming techniques, the invention is not limited to any such techniques and may be implemented using any appropriate techniques for implementing the functionality described herein. The described embodiment is written in the C++ programming language and runs under the Windows 95 operating system, but the invention is not limited to any particular programming language or operating system. ("Windows 95" is a trademark of Microsoft Corporation.)

Creation and Manipulation of a Web Page Layout

Figure 2:
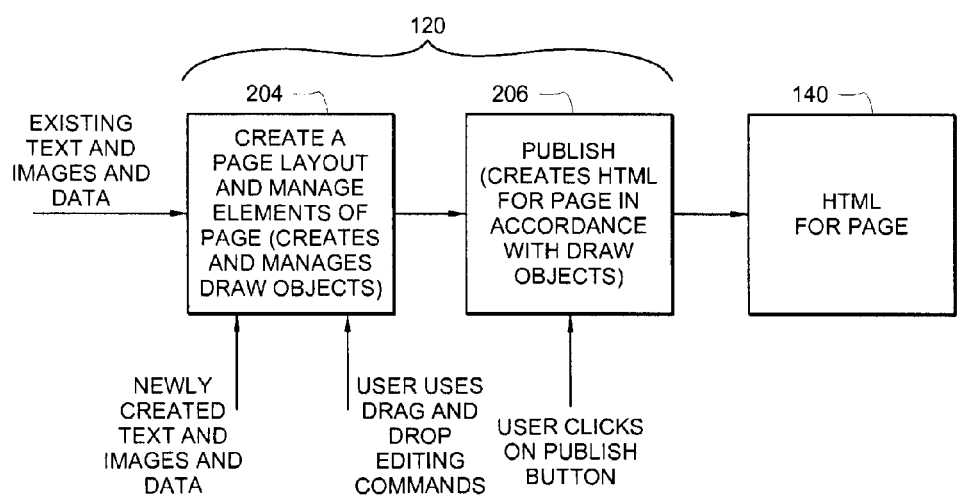
FIG. 2 is a block diagram showing input and output to and from page draw editor software of FIG. 1.

FIG. 2 is a block diagram showing input and output to page draw editor software 120 of FIG. 1. Page draw editor 120 includes a portion 204 that creates and manages a page layout and a portion 206 that publishes the page. The user uses a drag and drop interface to define the page layout. Pages can include new text and images or preexisting text and images. The user initiates publish portion 206 by clicking on a "publish" button displayed by the editor 120, as described below. Publish portion 206 generates an internal representation of a page (such as a representation in HTML), as also described below. The page preferably is translated into an internal representation (such as HTML) that yields a WYSIWYG Web page when displayed by a browser.

Creating and Modifying Display Elements of a Page Layout

Figure 3:
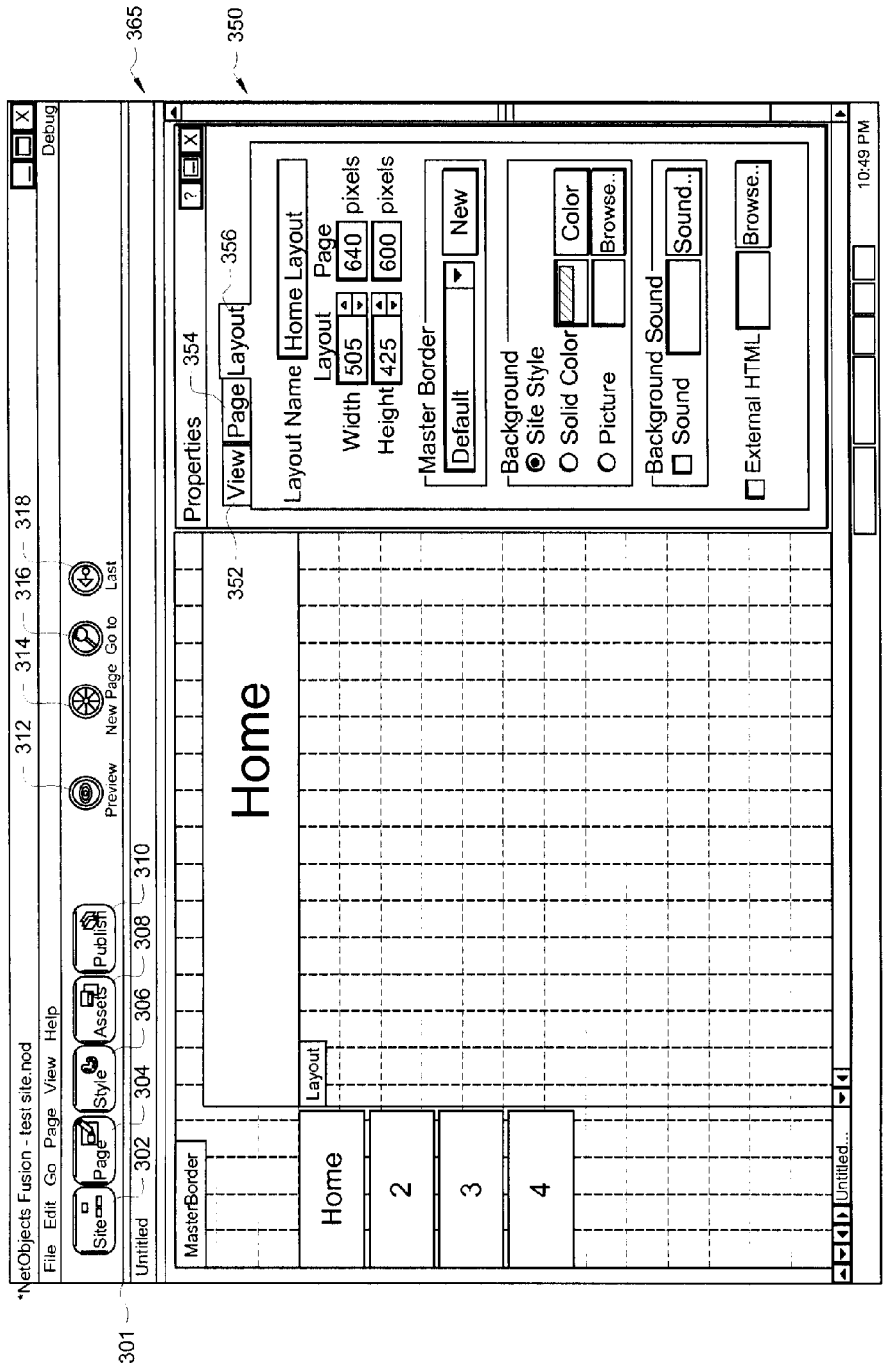
FIG. 3 shows an example of display view before the user has created any display elements on the page.

FIG. 3 shows an example of a page view displayed on display device 160 before the user has created any display elements on the page. The display of FIG. 3 is opened when the user indicates (using a pull-down menu or the like) that he wishes to view the layout of a page in the site. In the described embodiment, the user clicks on a "Page" button 304 in the navigator bar. In the example, the user has chosen to view a "Home" page in his site. The site has previously been defined by the user as having the Home page and three "children" pages (named "2," "3," and "4" in the example) for the Home page.

The page draw editor allows the user to design a page just as it will appear when viewed with a browser. The user uses page draw editor 120 to add text graphics, and other display elements to the page. The user can then rearrange display elements by dragging and dropping them to a new location, placing the display elements exactly where they will eventually appear with pixel level accuracy.

A title 301 of the page defaults to the name of the page (e.g., "Home"). FIG. 3 includes a grid of lines. These lines are shown as dotted lines, but can also be solid lines. In the described embodiment, the grid also can be turned off so that no grid is displayed. The grid preferably is not included in the generated internal representation. In FIG. 3, the grid has a default granularity of 24×24 pixels.

The display of FIG. 3 includes a plurality of buttons: a "Site" button 302, "Page" button 304, a "Style" button 306, an "Assets" button 308, and a "Publish" button 310. The display also includes a "Preview" button 312, a "New Page" button 314, a "Goto" button 316, and a "Last" button 318. Site button 302 causes execution of a "site editor" as described in U.S. application Ser. No. 08/687,971 of Arora et al. Style button 306 and Assets button 308 are discussed in copending application Ser. No. 08/687,974 of Arora et al. New Page button 314 causes a page such as the page of FIG. 3 to be displayed.

Goto and Last buttons 316, 318 transfer control to a most recent display or a user-selected previous display, in a manner known to persons of ordinary skill in the art. The described embodiment keeps a "history" of execution of page draw editor 120 in order to implement the Goto and Last buttons.

FIG. 3 also shows "Properties" window 350 in which a "Layout" tab 356 is selected. Properties window 350 includes three tabs: a "View" tab 352, a "Page" tab 354, and "Layout" tab 356. The values shown in Properties window 350 are values for the current page. Properties window 350 currently shows layout properties because Layout tab 356 is selected and the cursor is in the "layout" section of the page. A fourth tab (not shown) is a context sensitive tab and represents various properties, depending on the drawing tool being used and/or the position of the cursor. Other tabs may appear in other implementations. It will be understood by persons of ordinary skill in the art that page draw editor software 120 stores values corresponding to this Property window and each Properties window discussed herein in memory 104. All values in Properties window 350 may be changed by the user. Corresponding values in memory 104 will be changed accordingly.

It will be understood that an empty page can be edited in the same manner as an existing page.

FIG. 3 shows a banner and navigator buttons automatically created by a preferred embodiment of the present invention. The example of FIG. 3 is displayed after the user indicates that he wants to edit an existing page by preferably: 1) double clicking on an icon for the page in a "site view" (not shown) or 2) selecting a page icon and clicking "Page" button 304. The described embodiment of the present invention automatically creates certain draw objects in memory for the page. The automatically created draw objects reflect links between pages of the site, as described in U.S. application Ser. No. 08/687,971 of Arora et al. The user can easily create and move display elements on the page, which causes changes to corresponding draw objects in memory 104.

Creation of Draw Objects for the Display Elements

Figure 4A:
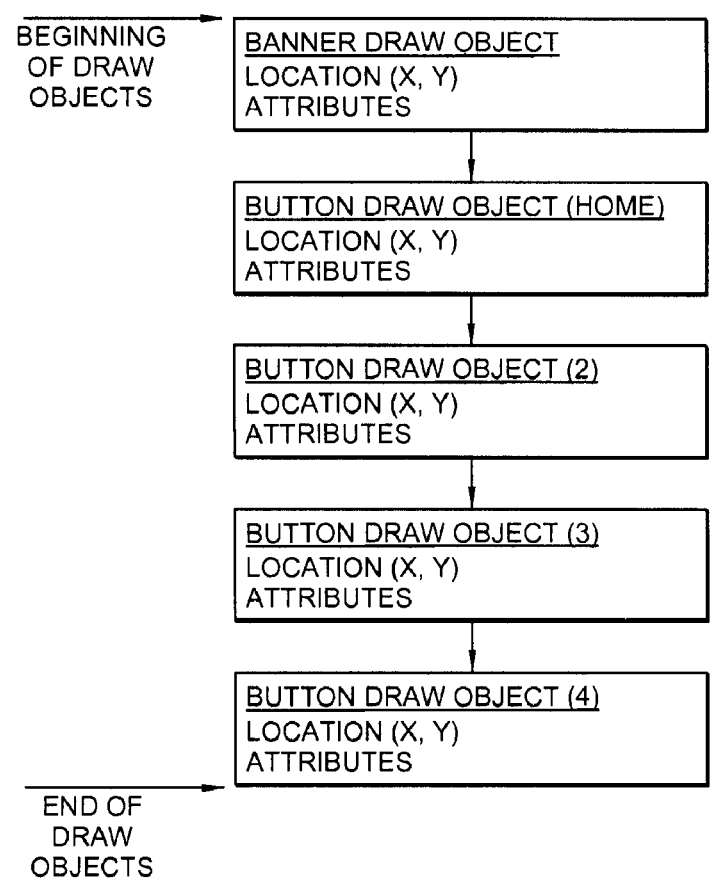
FIG. 4(a) is a diagram showing exemplary draw objects stored in a memory in accordance with the display elements of FIG. 3.

FIG. 4(a) is a diagram showing exemplary draw objects stored in memory 104 in accordance with the display elements of FIG. 3. In the described embodiment, each display element has a corresponding draw element. The draw objects are stored in a list. When the user alters the position of a display element on the screen, the values stored in the corresponding draw object are also altered. The position of the draw object in the list does not usually change, however. FIG. 4(a) shows five draw objects, corresponding to the banner and four buttons of FIG. 3. There are other elements in the layout elements list (such as border elements) that are not shown for the sake of ease of explanation.

It will be understood that all draw objects discussed in the following paragraphs include a screen position field (indicating the X and Y coordinates of the objects' current position on the screen), the height and width of each draw object on the screen, and various flags associated with display of the object. Flags include whether the object has a frame drawn around it, whether the object may be resized to zero width or height, whether the object itself handles mouse commands internally, whether the object is currently selected, the color of the object, whether the object is transparent, whether the object contains text, etc. It will be understood that the specific flags stored in an object may vary from implementation to implementation. The position, height, width and flag values are not shown for the sake of clarity. It will also be understood that each type of draw object contains the data required to describe the appearance and function of the corresponding display element.

Draw objects can be of a variety of types or classes. It will be understood an embodiment of the present invention does not necessarily include any specific types of draw objects and may include more or fewer types of draw objects than are discussed herein. The draw objects in a preferred embodiment include, without limitation:

rectangle,
round rectangle,
line,
ellipse,
text,
picture/image,
polygon,
OLEobject,
JavaScript,
database list,
database field,
form button,
form radio button,
form checkbox,
form edit,
form combobox,
form clear button,
zoomin,
zoomout,
grid,
graphic, hotspot rectangle,
hotspot polygon,
hotspot ellipse,
background picker,
Shockwave object,
Sound,
Video,
ActiveX,
Form Multi edit, and
MAX SHAPE In the described embodiment, each type of draw object has associated information that, in general, allows the draw object to be displayed on display device 150 in accordance with user draw commands. This information is also used to generate HTML for the object (including links and anchors).

FIG. 4(*b*) shows an example of a draw object for text. In the described embodiment, draw objects for text each contain a "locked_size flag," that indicates whether the size of the text can be changed when the page containing the text is viewed with a browser. The flag is preferably set as discussed below in connection with FIG. 8. Whether the locked_size flag is set affects generation of HTML as also discussed below.

Figure 5:
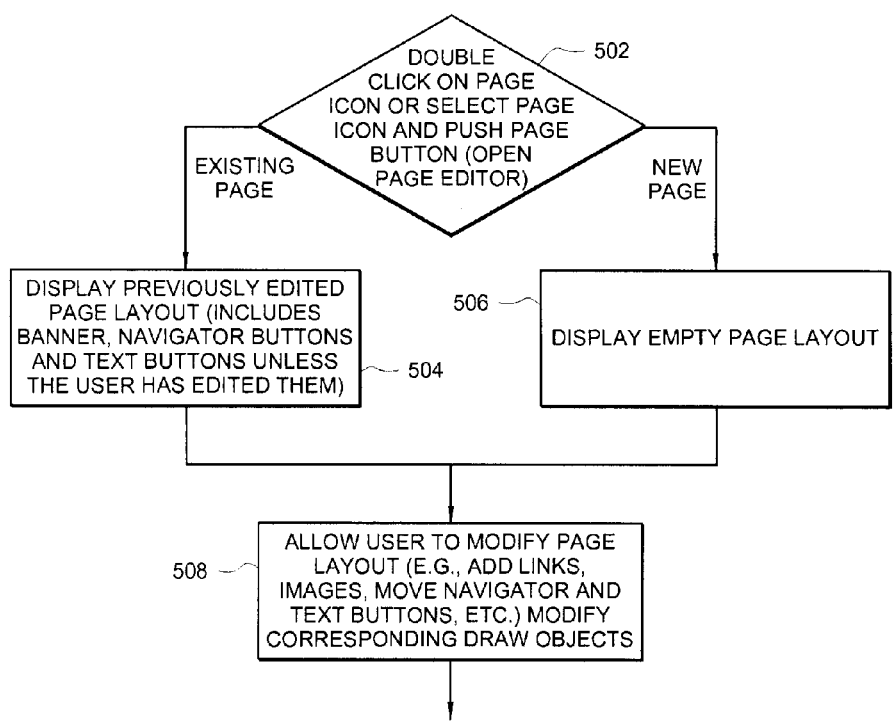
FIG. 5 is a flow chart showing steps performed by the page draw editor software to define a page layout.

FIG. 5 is a flow chart showing steps performed by page draw editor software 120 to edit a page layout during execution of the page draw editor. In step 502, the page draw editor determines whether the page is a new page. If it is an existing page, in step 504, the current page layout for the page is displayed in accordance with the already existing draw objects stored in memory for the page. The page layout automatically includes the automatically generated banner and navigator buttons, unless the user has previously deleted them.

If the page is a new page, in step 506, the editor displays the default page layout for a new page. The user exits the page draw editor by, e.g., clicking on Site button 302, Style button 306, Assets button 308, or Publish button 310 (or by selecting "exit" from a pull-down menu). After the user has edited a page, he can still move the page around in the site hierarchy by using the structure/site editor, as described in the co-pending application of Arora et al.

As shown in step 508, the user can add display elements to the page and can move existing display elements via a "drag and drop" interface, or any other appropriate interface. As discussed below, each time the user moves an element on the display, a corresponding draw object in memory 104 is modified in accordance with the user's action.

User-Defined Split Direction

The present invention allows the user to specify whether a web page is primarily laid out by rows or by columns. The following discussion provides an example of each organization.

Figure 6A:
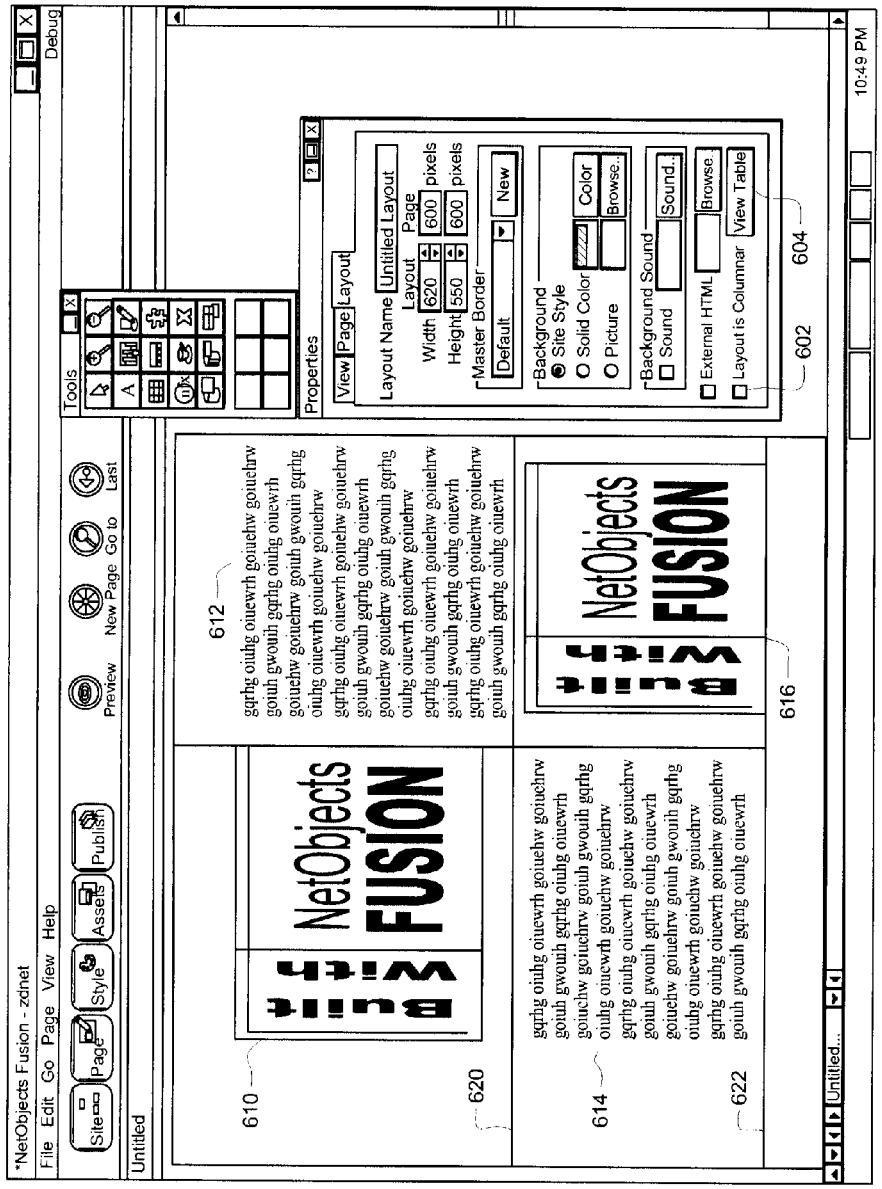
FIG. 6(a) shows a screen display of an editor where a page is primarily laid out in rows.
Figure 6B:
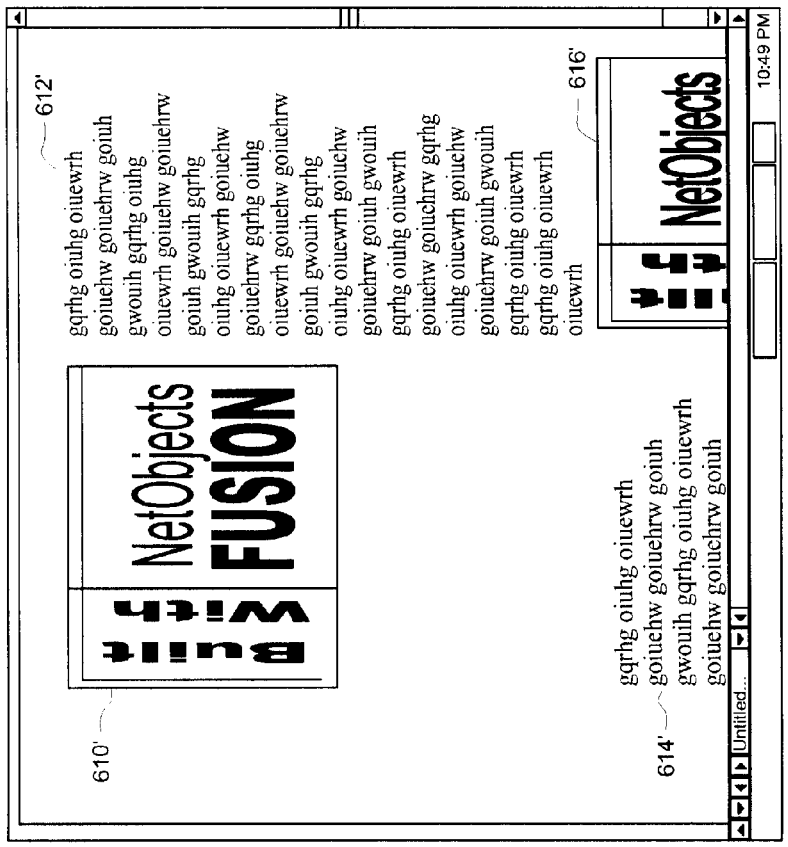
FIG. 6(b) shows the screen of FIG. 6(a) as displayed by a browser when the user has changed the size of text in the browser.

FIG. 6(*a*) shows a screen display of an editor where a page is primarily laid out in rows. In the example, the page includes two images 610 and 616 and two text areas 612 and 614 (banners and navigation buttons are not shown in the example). In the example, the images' and text were "dragged and dropped" onto the page as described in copending U.S. application Ser. No. 08/687,974 of Arora et al. The display elements on the page can be any appropriate type of display elements. The images and text shown here are provided for the purposes of example. As discussed above, the present invention solves certain problems caused by the way certain browsers size and display text.

A Properties window 601 has a "layout" tab selected. The layout properties include a checkbox 602 labeled "Layout is columnar". In the example, this box is not checked. Thus, the web page is laid out primarily in rows. In the example, when the user presses and holds down a "View Table" button 604, editor 120 performs a "split" procedure, which is defined below on in connection with FIG. 10. The split procedure determines the location of the rows of the page and displays one or more horizontal row dividers 620, 622 between the rows. The split procedure generates a "split tree" data structure (or any other appropriate data structure) which is then used to generate and display row or column dividers, as discussed below.

Whether the page layout is by rows or columns can be indicated by any appropriate method. For example, in an alternate implementation, box 602 is implemented as a "radio button," where the user can (and must) select either a layout by rows or a layout by columns. A radio button behaves just like a check box, except that only one radio button in a group can be checked at once and one box must be checked at all times.

FIG. 6(*b*) shows the screen of FIG. 6(*a*) as displayed by a browser. In FIG. 6(*b*), the user has changed the size of text displayed by the browser to be larger than envisioned by the designer of the page. Because the user has specified that the layout of the page is by rows, the HTML generated for the page preserves the rows in the design. Thus, the top of image 610' is aligned horizontally with the top of text 612' and the top of image 616' is aligned horizontally with the top of text 614'. This alignment preserves the rows indicated by row dividers 620 and 622.

Figure 7A:
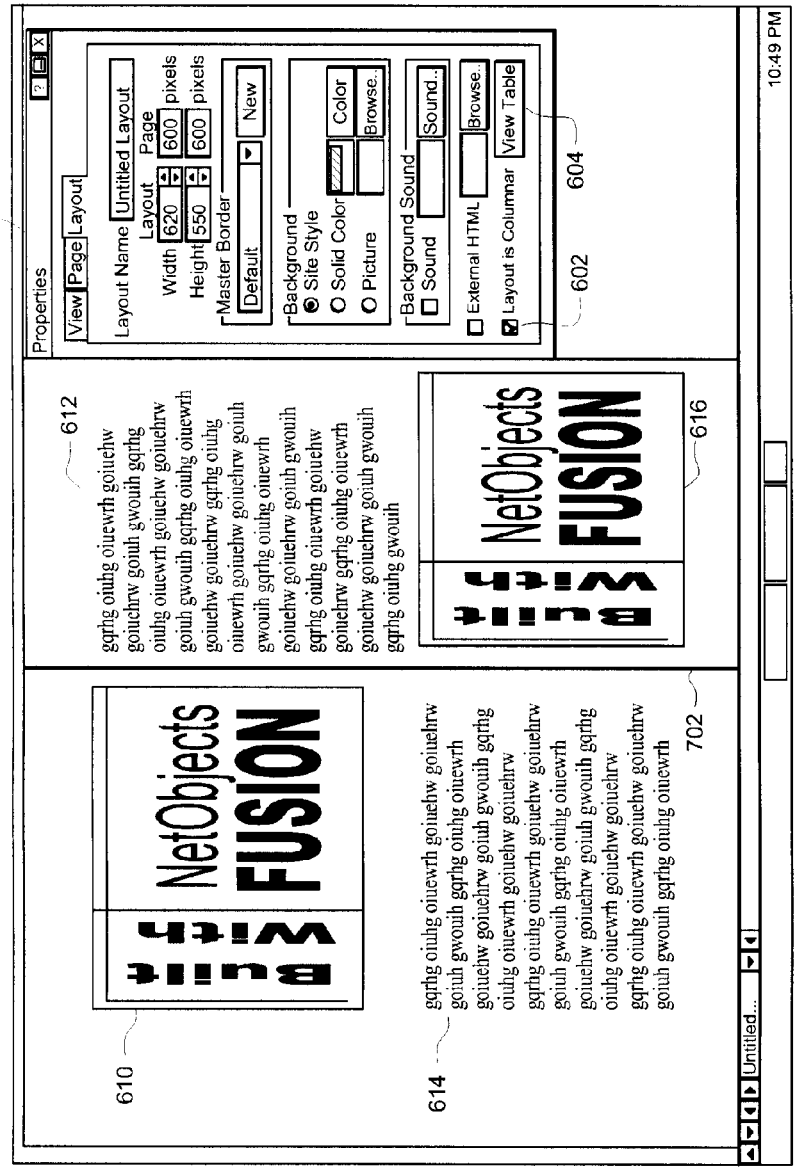
FIG. 7(a) shows a screen display of an editor where a page is primarily laid out in columns.
Figure 7B:
FIG. 7(b) shows the page of FIG. 7(a) as displayed by a browser when the user has changed the size of text in the browser.
Figure 7C:
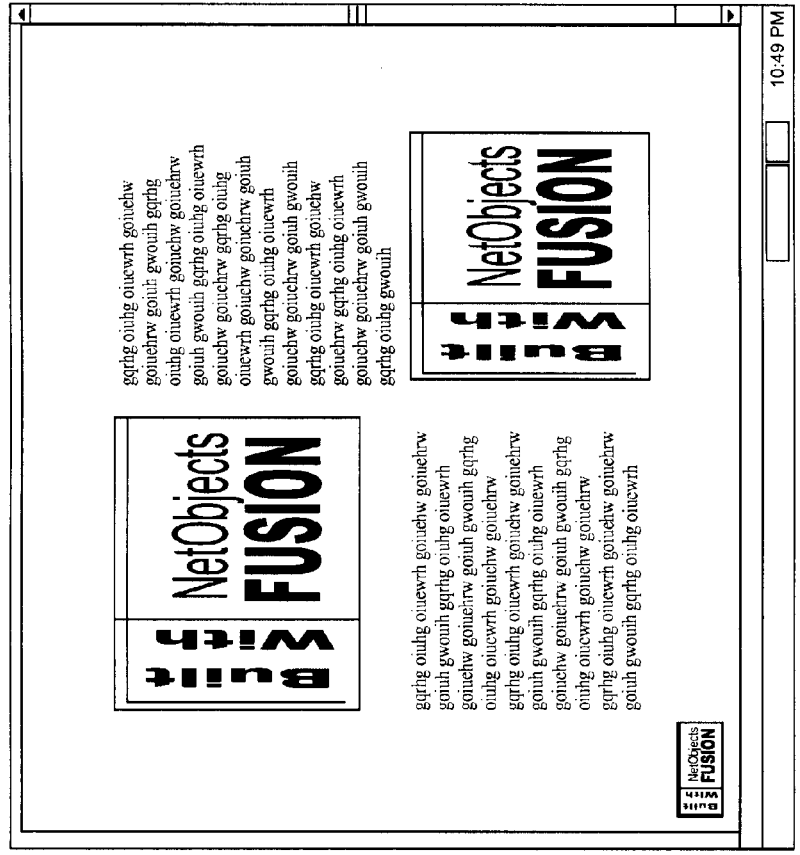
FIG. 7(c) shows another example of the page of FIG. 7(a) as displayed by a browser.

FIG. 7(*a*) shows a screen display of an editor where a page is primarily laid out in columns. In FIG. 7(*a*), box 602 is checked. Therefore, the layout of the page is by columns. As shown, when the user presses down and holds "view Table" button 604, editor 120 performs the "split" procedure to determine the location of columns on the page and a vertical column divider 702 is displayed.

FIG. 7(*b*) shows the page of FIG. 7(*a*) as displayed by a browser. In FIG. 7(*b*), the user has changed the size of text displayed by the browser to be larger than envisioned by the designer of the page. Because the user has specified that the layout of the page is by columns, the HTML generated for the page preserves the columns in the design. Thus, the left edge of image 610' is aligned vertically with the left edge of text 614' and the left edge of text 612' is aligned vertically with the left edge of image 616'. This alignment preserves the columns indicated by column divider 702.

FIG. 7(*c*) shows the page of FIG. 7(*a*) as displayed by a browser when the user has changed the size of text in the browser. In the example, the user has changed the size of the text to be the same size as envisioned by the page designer. The columnar layout of the page is still maintained because of the HTML generated for the page by editor 120.

User-Defined Locked Text Size

Figure 8:
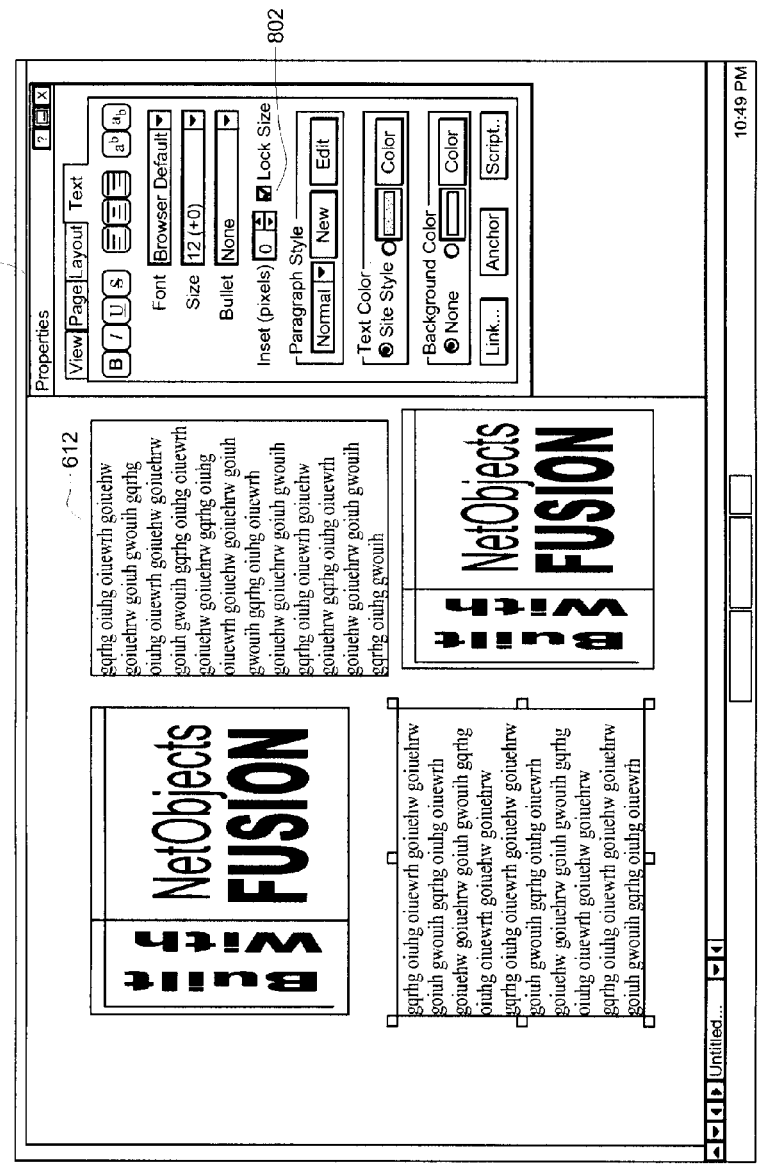
FIG. 8 shows a screen display of an editor where text in a page is locked in size.

FIG. 8 shows a screen display of an editor where the user can lock the size of text in a page. In the Figure, the user has selected text 612. Selection of a text display element causes editor 120 to display the optional fourth tab in window 601 as a "Text" tab. In the Figure, the user has checked a "Lock Size" box 802 in window 601. When box 802 is checked, editor 120 sets a corresponding "locked_size" flag in the draw object corresponding to the selected text 612 (see FIG. 4(*b*)). Locking the size of text causes the area on the page occupied by the text to become fixed when the text is viewed by a browser. This is accomplished via the HTML generated for the page (as described below in connection with FIG. 16 et seq.). Thus, if the user changes the size of the text displayed by a browser to be larger than envisioned by the designer (and the size of the text is locked), only a portion of the text will be displayed when the page is displayed by the browser.

Figure 12A:
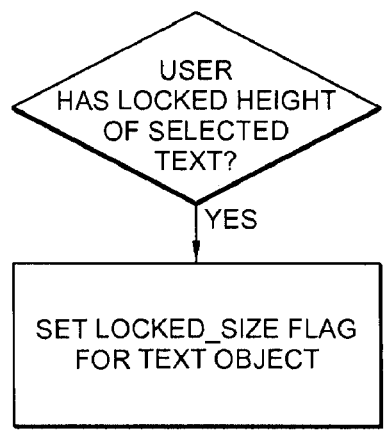
FIG. 12(a) is a flow chart showing steps performed when the user has locked the height of text in a page layout.
Figure 12B:
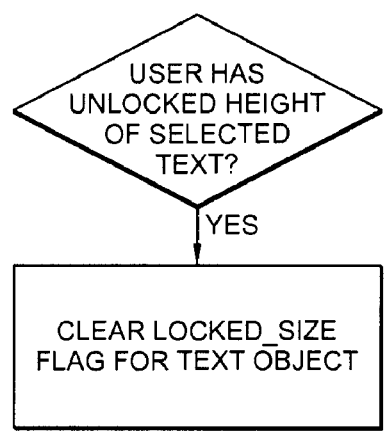
FIG. 12(b) is a flow chart showing steps performed when the user has unlocked the height of text in a page layout.

FIG. 12(a) is a flow chart showing steps performed when the user locks the height of text in a page layout. As shown in the Figure, if the user checks box 802, the locked_size of FIG. 4(b) is set in the draw object corresponding to the selected text. FIG. 12(b) is a flow chart showing steps performed when the user has unlocked the height of text in a page layout. As shown in the Figure, if the user clears box 802, the locked_size flag of FIG. 4(b) is cleared in the draw object corresponding to the selected text. The default value of the locked_size flag preferably is "cleared."

Frames Separately Splittable

Figure 9:
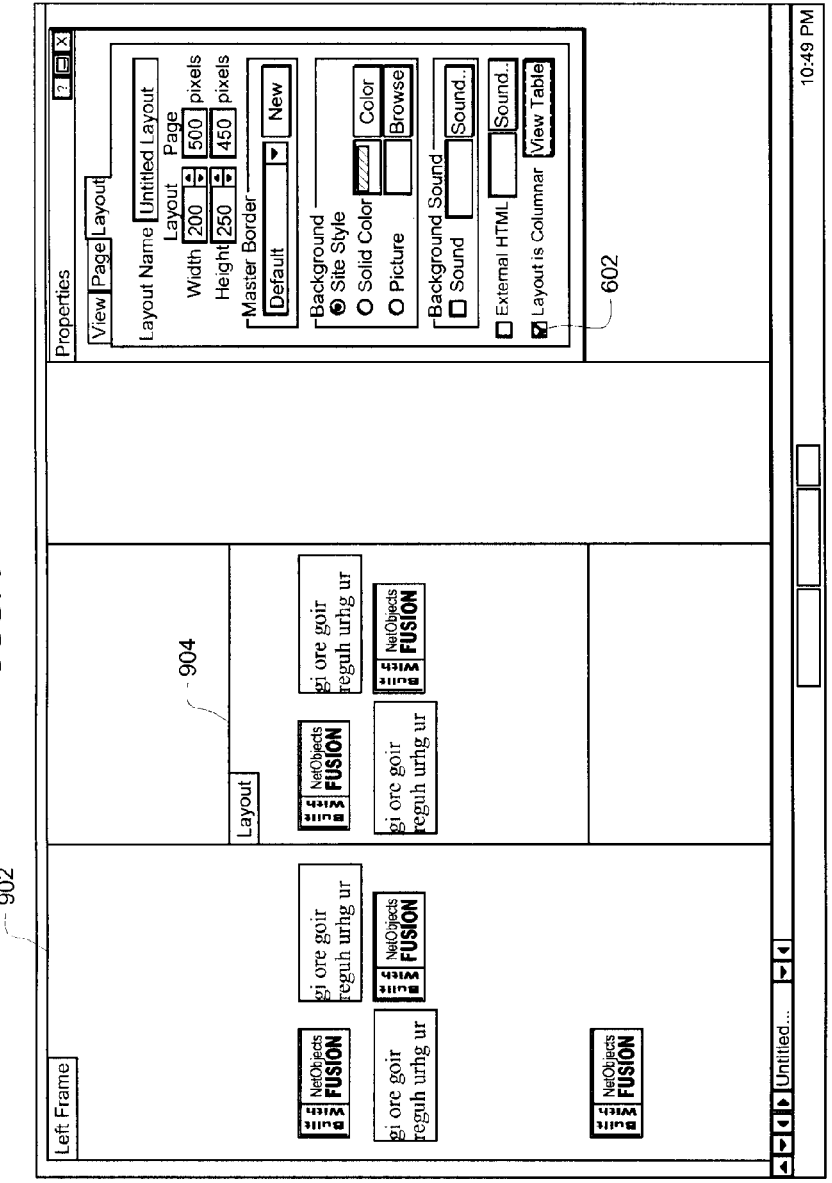
FIG. 9 shows a screen display of an editor where a defined page has several frames.

FIG. 9 shows a screen display of an editor where a defined page has several frames 902, 904. In the described embodiment of the present invention, the page designer can specify a columnar or row layout for each frame separately. In the example, frame 904 is selected and box 602 is checked. Thus, frame 904 will be laid out by columns. Frame 902, however, could be laid out by either rows or columns.

The "Split" Procedure

As discussed above, the present invention allows the user to specify whether a page is laid out primarily by rows or by columns. Depending on the user's specification, the HTML generated for the page creates subtables that cause the page to either maintain a columnar or row layout.

The "split" procedure is performed by editor 120 to determine the location of the rows (or columns) in a page. The split procedure is performed when the user presses View Table button 604 (or otherwise indicates that the user wants to view the columns/rows of the page). The split procedure is also performed when editor 120 generates HTML for the page (so that the HTML contains subtables implementing the specified columnar or row layout). The outcome of the split procedure is a "split tree" reflecting how the elements of the page are split into rows or columns. An example of a node in the split tree is shown in FIG. 13(c).

FIG. 10 is a flow chart showing steps performed during the "split" procedure when the user has pressed "View Table" button 604. This flow chart is most easily understood by reference to the examples of FIGS. 13–15. As indicated in step 1002, the split procedure is performed when the user presses the "View Table" button or when the editor generates an internal representation (such as HTML) for the page. In step 1004, editor 120 determines whether the layout direction is by columns. In the described embodiment, this will be true if the user has checked the box 602. If the determination of step 1004 is positive, control passes to step 1008 where a split direction is set to "vertical" and an "other direction" is set to horizontal. In step 1006, editor 120 determines whether the layout direction is by rows. In the described embodiment, this will be true if the user has not checked the box 602. If the determination of step 1006 is positive, control passes to step 1010 where a split direction is set to "horizontal" and an "other direction" is set to vertical.

The splits procedure generates a split tree, where the root node represents the whole page (or frame) and each child of a node represents an area into which the area of the parent node has been split. Thus, the first time that step 1002 is performed for a page, it will examine the whole page. If the page is splittable, as discussed below, the page is split and the split procedure is called recursively for each new split area. Other implementations of the present invention may use non-recursive implementation methods.

In step 1011, editor 120 checks whether splits are needed for the area under consideration. In the described embodiment, this determination is made by determining whether there are any text display elements in the area (or whether there are any other types of objects whose size can change in a browser). Further, a determination is made as to whether changing the size of the text (or other sizable object) could normally cause another movement of another object in the area. Such a situation is called an "overlap."

In step 1012, if there are any splits in the user-specified split direction, these splits are recorded in step 1014 (using a split tree data structure as shown in the examples). Preferably, only splits that will prevent text from moving other display elements are made (Thus, a second test for overlaps is preferably made in step 1014). These new split areas are added to the split tree as children of the current area (with an indication that the split was in the user-specified direction). If no splits exist in the user-specified direction, in step 1016, editor 120 attempts to make a minimum number of splits in the other direction, with the hope that this will cause some new splits to show up in the desired split direction. In the described embodiment, step 1016 includes the substep of: determining all possible splits in the "other" direction and picking the shortest in height (e.g., display element 1402 of FIG. 14(a)). Thus, it is possible that step 1016 may split an area into two split areas (as in FIG. 14(a)) or into three split areas (as in FIG. 14(c)). These new split areas are added to the split tree as children of the current area (with an indication that the split was in the "other" direction).

Figure 11A:
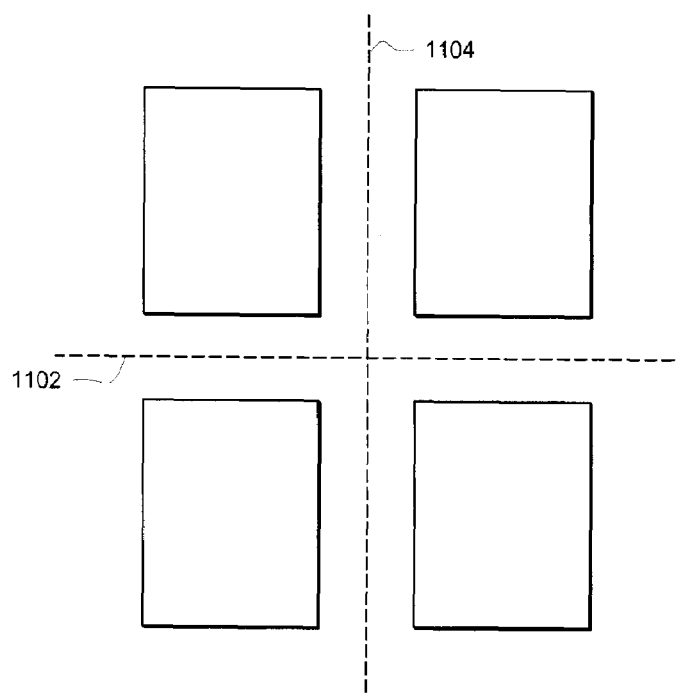
FIG. 11(a) is a diagram showing splittable display elements.
Figure 11B:
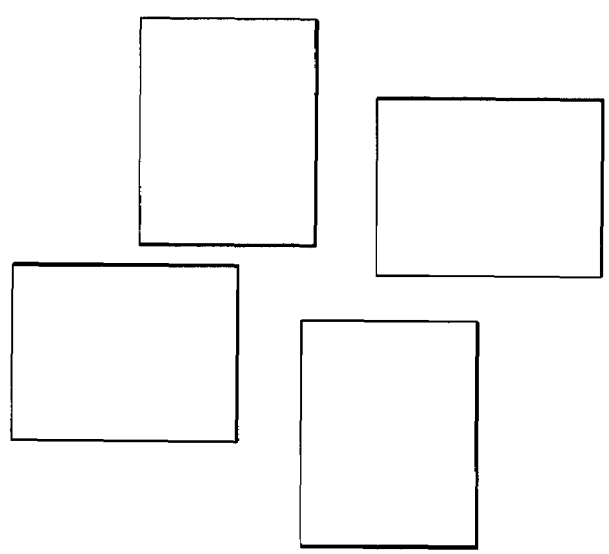
FIG. 11(b) is a diagram showing non-splittable display elements.

FIG. 11(a) is a diagram showing splittable display elements, while FIG. 11(b) is a diagram showing non-splittable display elements. The four display elements of the other hand, there are no splits possible for the objects of FIG. 11(b), since there are no horizontal or vertical lines that do not intersect at least one of the display elements. Editor 120 determines whether a split is possible by inspecting the position and size of each display element being considered. The position and size can be determined from the corresponding draw object.

In step 1017, the split procedure is recursively called for each new split area from step 1014 or step 1016, so that these new split areas can be further split, if possible. If no splits exist for an area in step 1011, the split procedure returns from a recursive call in step 1018. In the described embodiment, the display elements are split are much as possible. Other embodiments may perform only a predetermined number of splits.

Figure 13A:
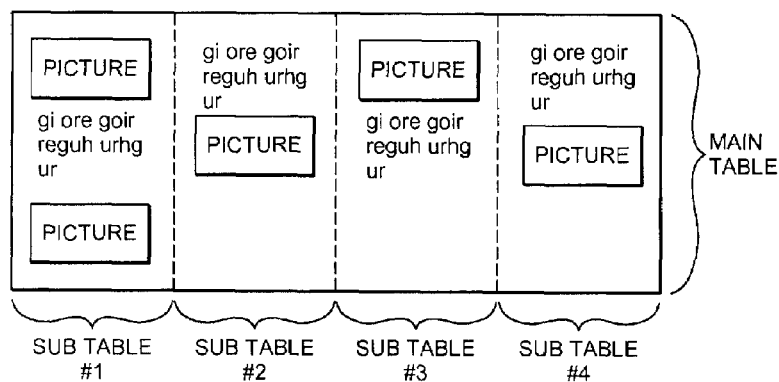
FIGS. 13(a) and 13(b) show, respectively, an example of a page that has been laid out in columns and a corresponding data structure stored in memory representing the page.
Figure 13B:
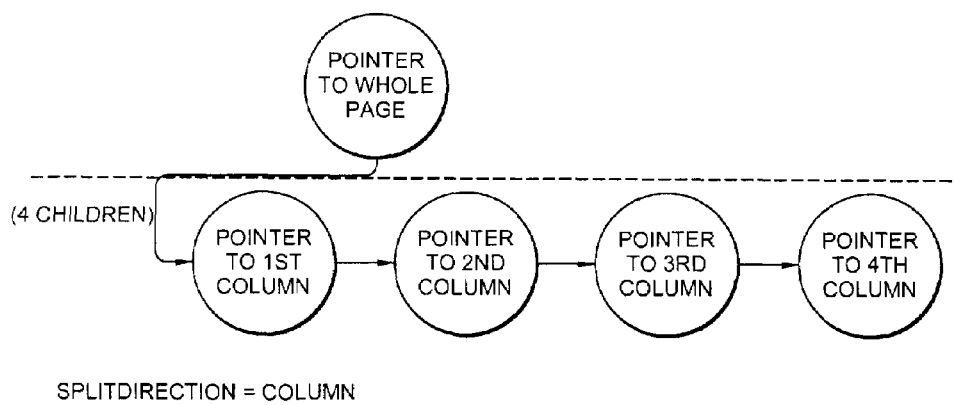

FIGS. 13(a) and 13(b) show, respectively, an example of a page that has been laid out in columns and a corresponding data structure stored in memory representing the page. ("T" represents a text display element and "I" represents an image display element). The page has been split into four columns. A tree data structure (the split tree) of FIG. 13(b) has a parent node representing the whole page and four children nodes representing each of the four columns.

Figure 14A:
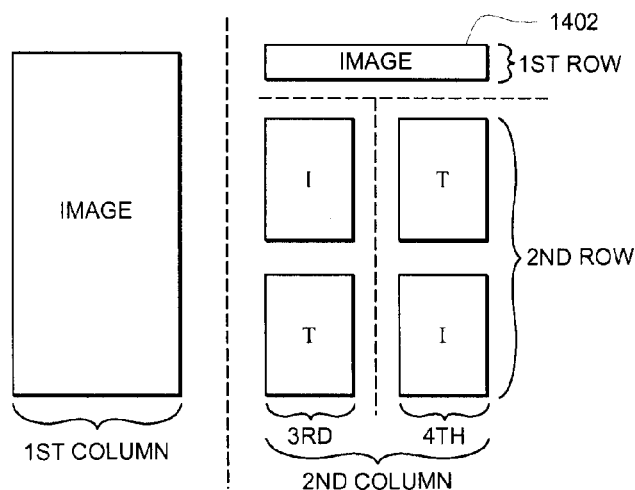
FIGS. 14(a) and 14(b) show, respectively, an example of a page that has been laid out in columns and a corresponding data structure stored in memory representing the page.
Figure 14B:
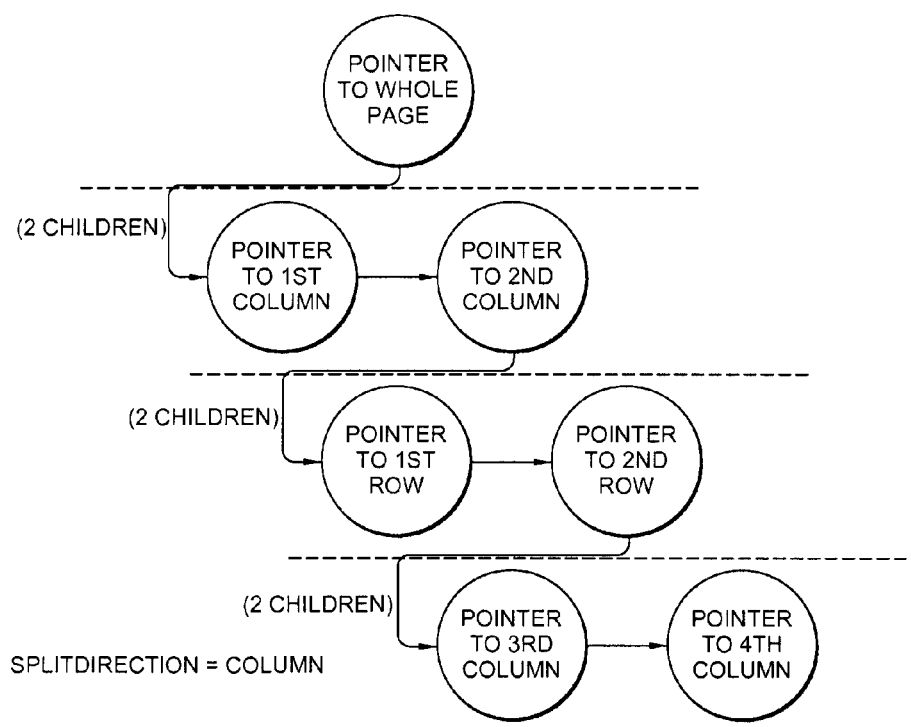

FIGS. 14(a) and 14(b) show, respectively, an example of a page that has been laid out in columns and a corresponding data structure stored in memory representing the page. The page has been split into two main columns. The right-hand column has an image 1402 that has a height less than that of any other elements in its row. Thus, the described embodiment places a split between that image and the other elements of the right-hand column, splitting the right hand column into two rows. The four objects in the bottom row have been further split into two columns. A tree data structure of FIG. 14(b) (the split tree) has a parent node representing the whole page, two children nodes representing each of the two columns, two sub children representing the two rows, and two sub—sub children representing the sub-columns.

Figure 14C:
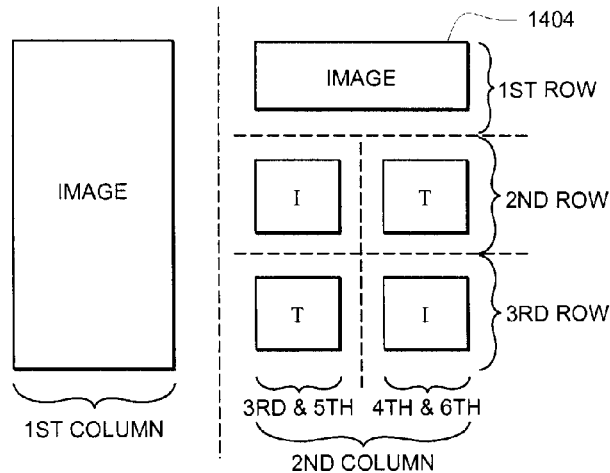
FIGS. 14(c) and 14(d) show, respectively, an example of another page that has been laid out in columns and a corresponding data structure stored in memory representing the page.
Figure 14D:
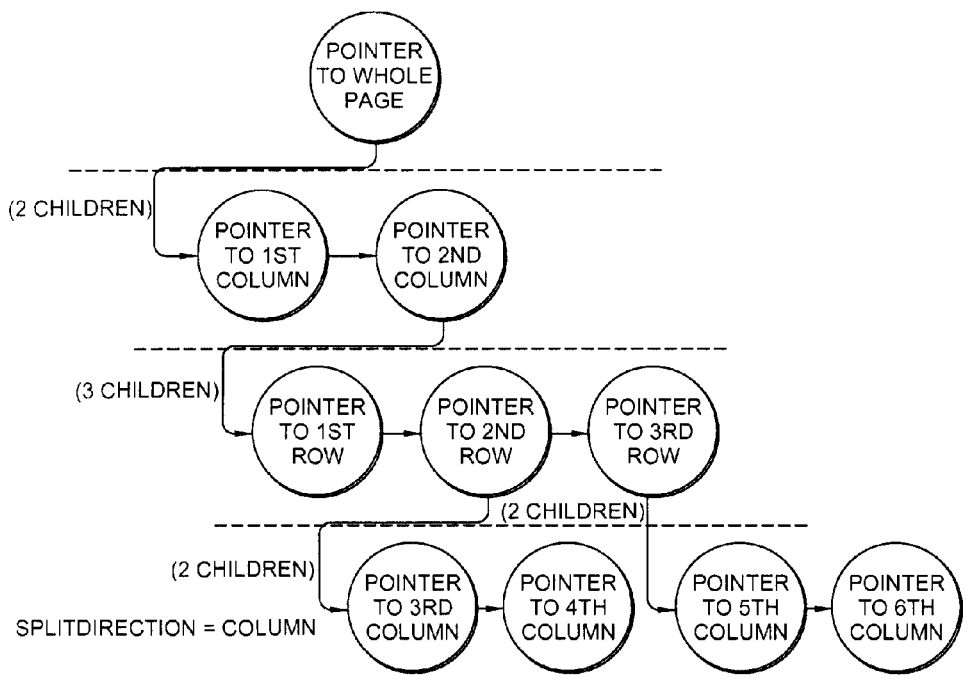

FIGS. 14(c) and 14(d) show, respectively, an example of another page that has been laid out in columns and a corresponding data structure stored in memory representing the page. FIG. 14(c) shows the page split into two main columns. The right-hand column has an image 1404 that has a height greater than that of any other objects in its row. Thus, the described embodiment places a split between that image and the other display elements of the right-hand column, splitting the right hand column into two rows. The four objects in the bottom row have been further split into two columns. A tree data structure (the split tree) has a parent node representing the whole page, two children nodes representing each of the two columns, three sub children representing the three rows, and two groups of two sub—sub children representing the sub-columns.

Figure 15A:
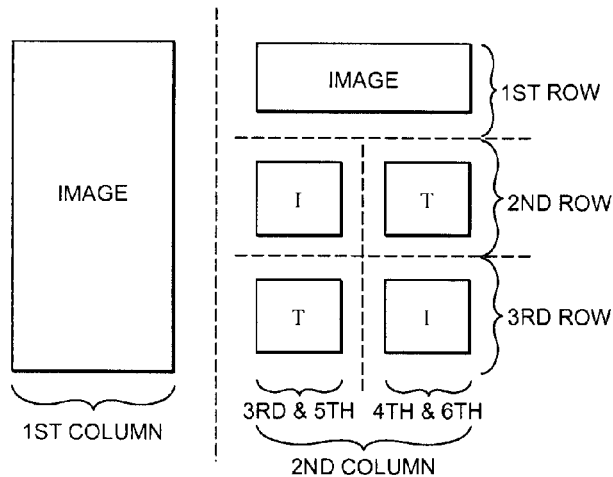
FIGS. 15(a) and 15(b) show, respectively, an example of the page of FIG. 14 that has been laid out in rows and a corresponding data structure stored in memory representing the page.
Figure 15B:
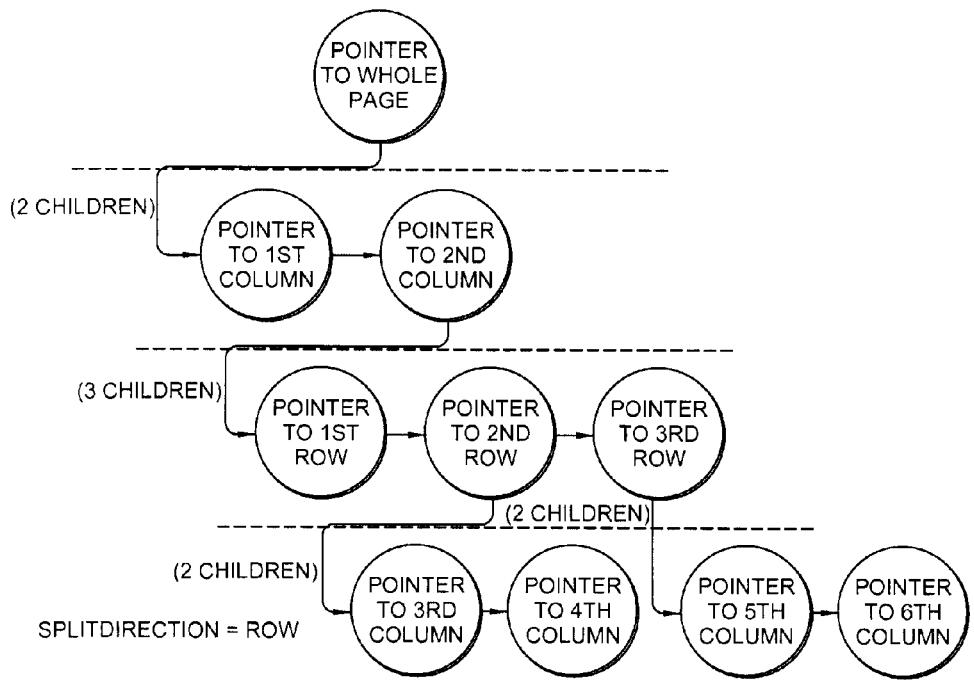

FIGS. 15(a) and 15(b) show, respectively, an example of the page of FIG. 14 that has been laid out in rows and a corresponding data structure stored in memory representing the page. The page has been split into two main columns, and the right-hand column has been split into three rows. Each of the two bottom rows is further split into two columns. A tree data structure has a parent node representing the whole page, two children nodes representing each of the two columns, three sub children representing the three rows, and two groups of two sub—sub children representing the sub-columns.

Publishing a Page

Once the user has created a layout for a Web page as described above, the user needs to be able to create HTML for the page in accordance with the draw objects of the page. In the described embodiment, this display actually allows the user to publish all pages in a Web site, as described in the co-pending U.S. application Ser. Nos. 08/687,974 and 08/687,971 of Samir Arora et al.

It will be understood that, generally, each page object has a corresponding list of draw objects describing the elements of the page layout, and that processor 102 generates HTML in accordance with the lists of draw objects. As described above, each list of draw objects automatically includes draw objects representing automatically generated banners and links (e.g., to the home, parent, sibling, and/or children pages of that page). These automatic links may be structural links. The draw objects of a page may also represent other, additional links added by the user that are not a part of the site hierarchy. Moreover, the user can use the page draw editor to remove some of the automatically generated draw objects links if he so desires. Unless the user explicitly removes them, however, these automatically generated links are present in each page layout. Thus, the generated internal representation for each page will contain links to the home, parents, siblings, and/or children pages for each page of the site view.

HTML Generation for a Page

Figure 16:
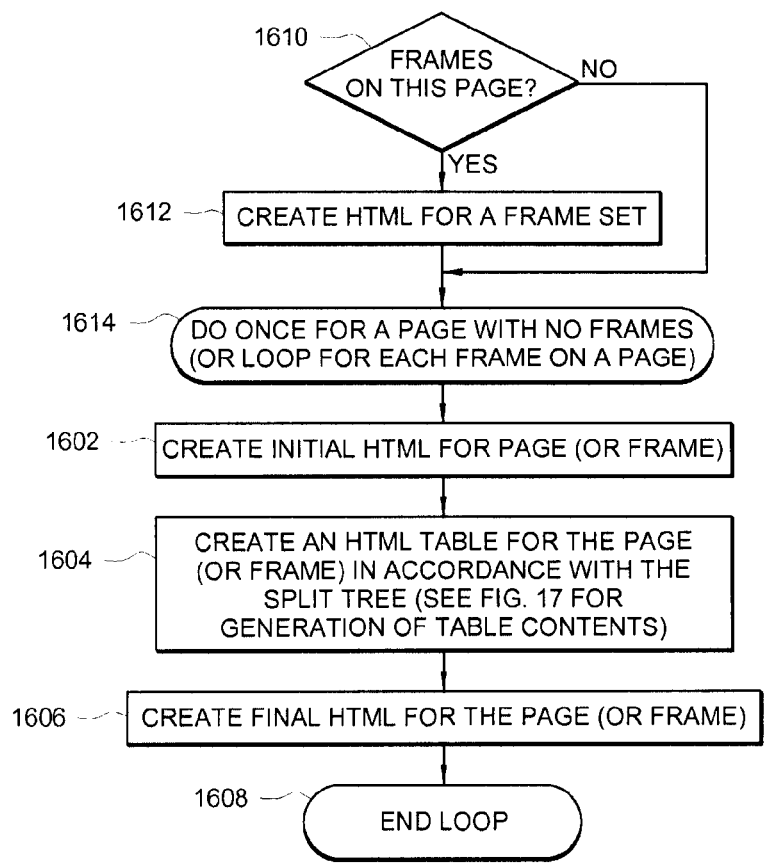
FIG. 16 a flow chart showing steps performed by the page editor software to publish a normal page.
Figure 17:
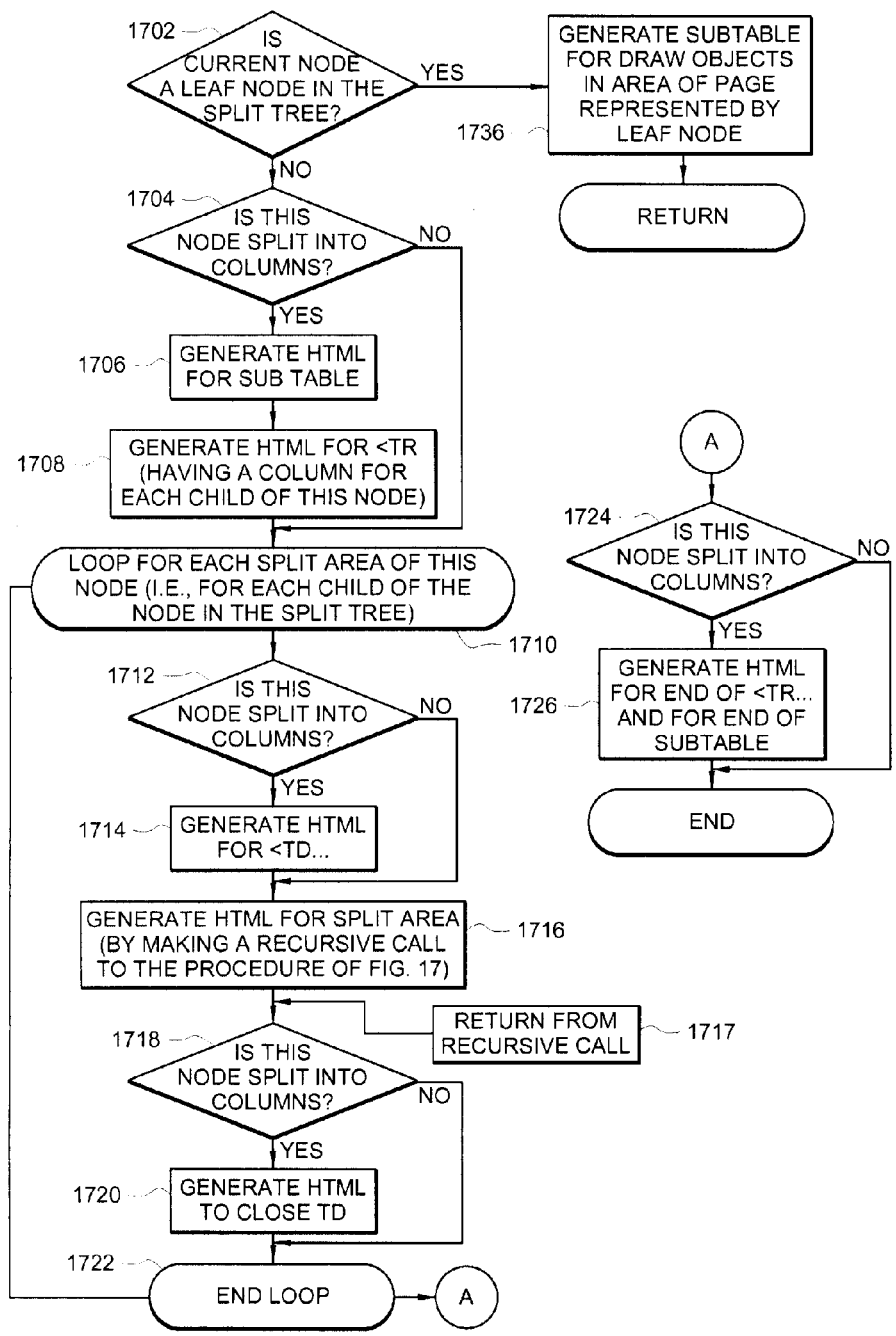
FIG. 17 is a flow chart showing steps performed by the structure editor software to create an HTML table.

FIG. 16 is a flow chart showing steps performed by the editor software 120 to publish a normal page. Step 1610 determines whether there are any frames on the page. If so, in step 1612, editor 120 generates HTML to create a frame set of the frames, as is known to persons of ordinary skill in the art. Steps 1614 through 1608 are a loop that is performed once if there are no frames on the page (or that are performed once for each frame on the page). Step 1602 creates initial HTML for the page as shown in FIG. 17. This step creates the beginning of an HTML page. Step 1604 creates an HTML subtable for the page (or for each frame, if the user has defined frames in accordance with the user-defined split direction). Step 1606 creates final HTML for the end of the page (or frame) as shown in FIG. 21. The described embodiment generates Netscape HTML version 3.X, although any appropriate version of HTML or (other web page representation language) could be used.

FIG. 17 is a flow chart showing steps performed by the structure editor software to create an HTML table. The method steps recursively through the split tree (see step 1716), generating HTML for the draw objects associated with the leaf nodes of the split tree, and generating tables, table rows, and table data for certain internal nodes of the split tree. Specifically, in the described embodiment, whenever a internal node that correspond to an area split into columns is encountered, HTML is generated to surround the HTML generated for the splits of that area (see, e.g., steps 1706, 1708, 1714, 1720, and 1726). Subtables for areas associated with the leaf nodes are generated as shown in FIG. 19 et seq.

Figure 18:
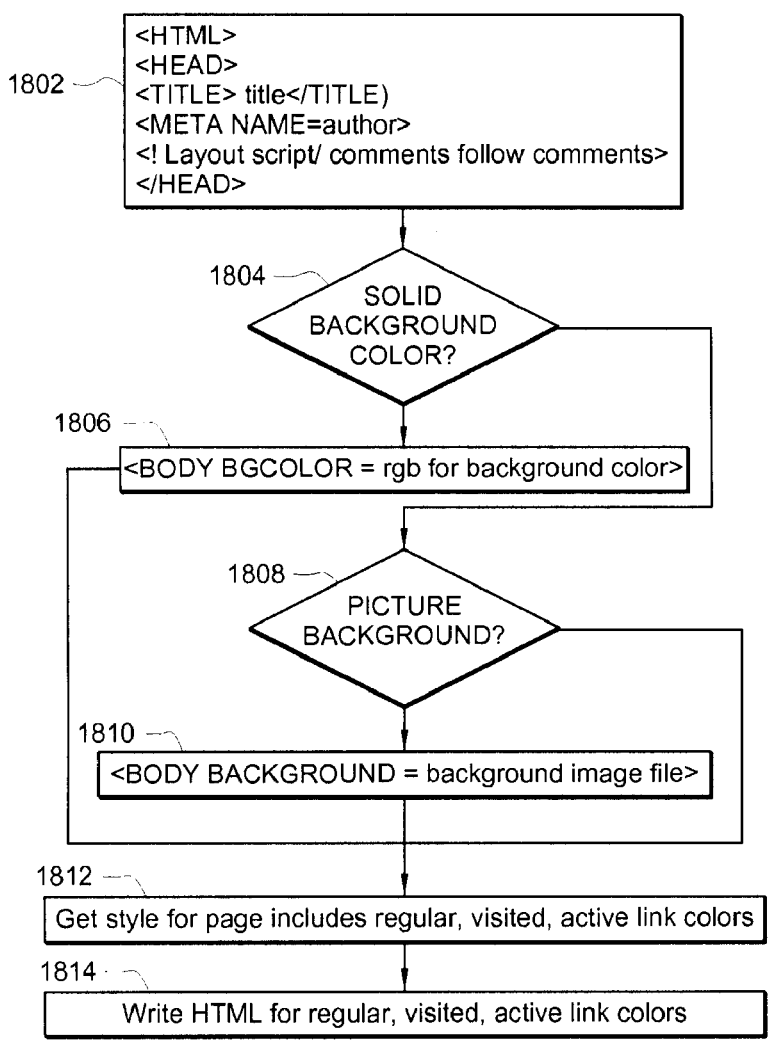
FIG. 18 is a flow chart showing steps performed by the page editor software to generate initial HTML for a page.

Step 1814 of FIG. 18 shows that the HTML for a page includes a tag specifying the colors that a browser will use to display regular, visited, and active links. Other embodiments specify other HTML tags that specify other attributes common to the page.

Figure 19:
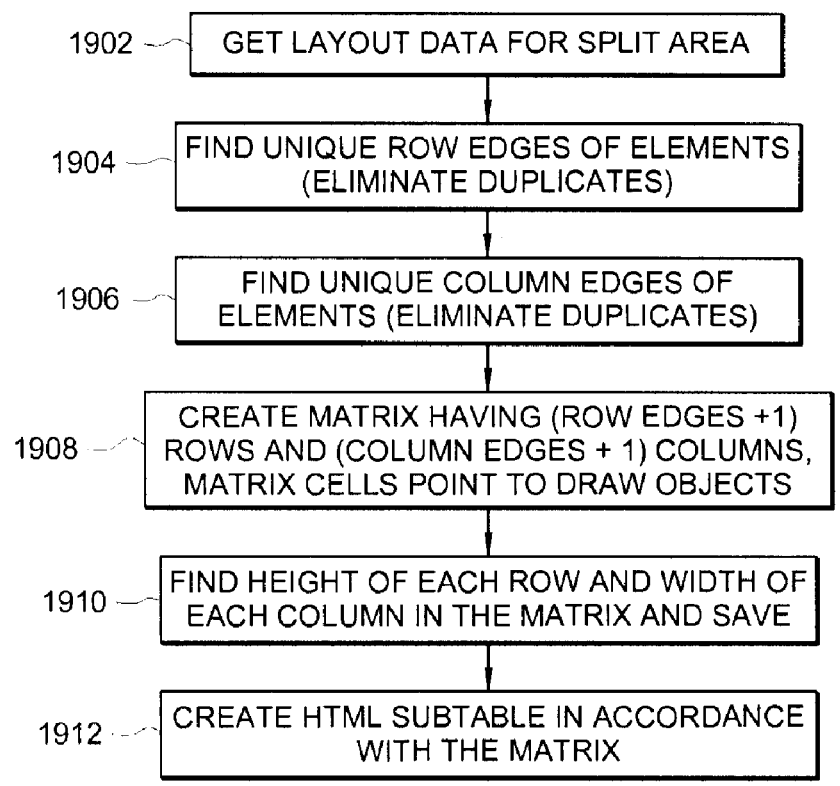
FIG. 19 is a flow chart showing further steps performed by the page editor software to generate an HTML table for layout elements of a page.

FIG. 19 is a flow chart showing steps to build an HTML subtable. A sub table is built for each area split in to a row or column by the split routine. Steps 1902–2308 generate a matrix in memory 104 as discussed below in connection with FIGS. 22–25. As shown in FIG. 4(c), each leaf node in the split tree has an associated list of draw objects associated therewith. Step 1912 creates the HTML subtable in accordance with the matrix as shown in FIG. 20.

Figure 20:
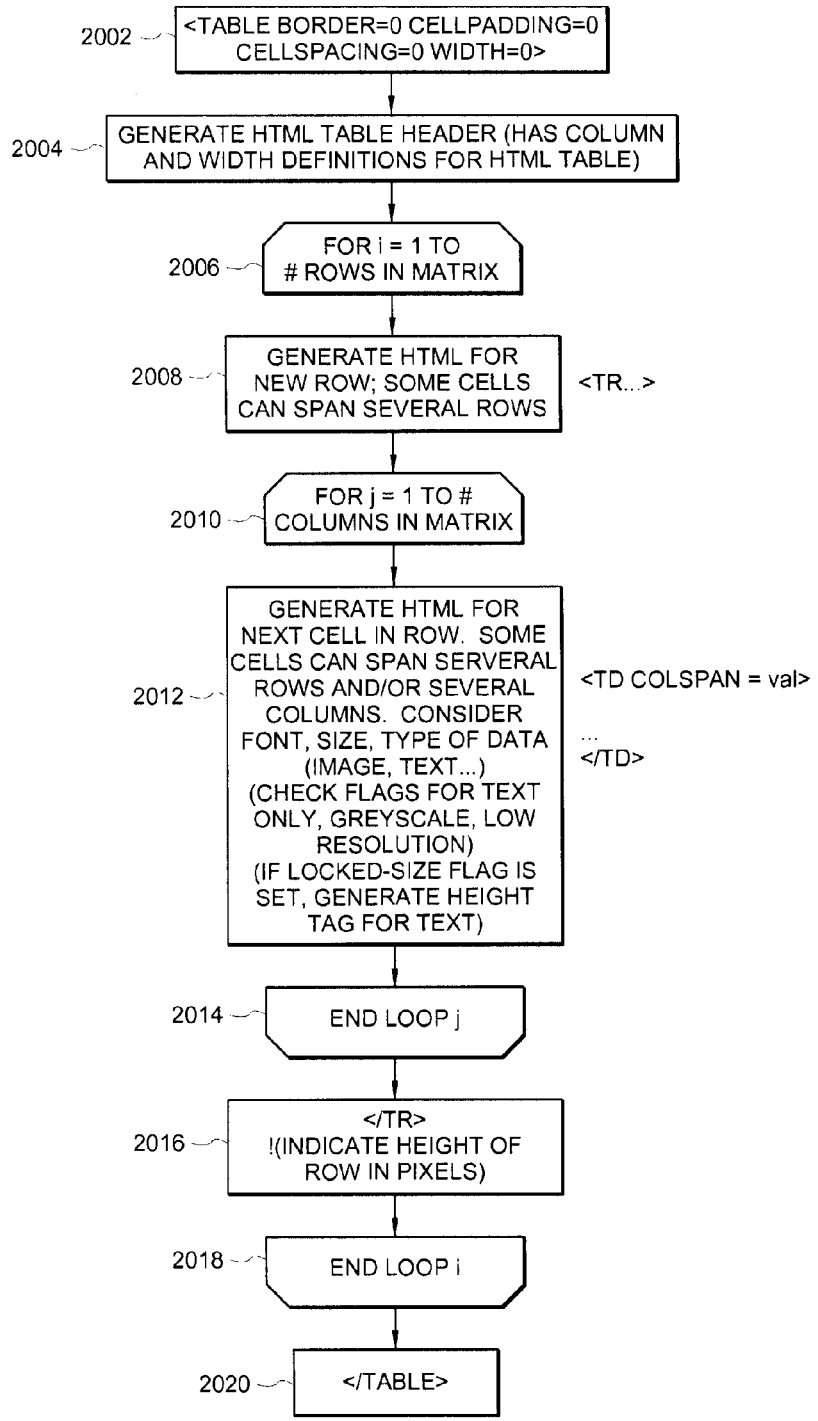
FIG. 20 is a flow chart showing steps performed by the page editor software to generate an HTML table.

FIG. 20 shows steps that create an HTML subtable. Step 2002 writes a table tag including a border of zero width and cellpadding and cellspacing of zero. Step 2004 generates a table header including column and width definitions for the HTML table. Step 2005, if the split directions is for columns, generates HTML to align the row (<TR . . . ).

Steps 2006–2418 go through each row and column of the matrix to generate a plurality of cells in the HTML table. Some of the cells in the HTML table can be several columns wide and/or several rows high. Step 2012 checks the size_locked flag to determine whether a text object needs to have a "height" tag generated for it. If the size_locked flag is set, a height tag is generated. Step 2020 generates an end of table tag.

FIG. 22 is an example of first steps involved in determining an HTML table size for a layout element of a header, body, or footer. In the example, the layout element has four display elements. Each display element corresponds to one draw object of the page. As discussed above, each draw object has an X position (a start row) and a length. Each draw object also has a Y position (a start column) and a height. For each object, a first column edge is the X start position and a second column edge is the X start position plus the length. In addition, for each object, a first row edge is the Y start position and a second row edge is the Y start position plus the height. Processor 102 finds the row edges and columns edges for a current page, yielding data 2202 and 2204.

Figure 23:
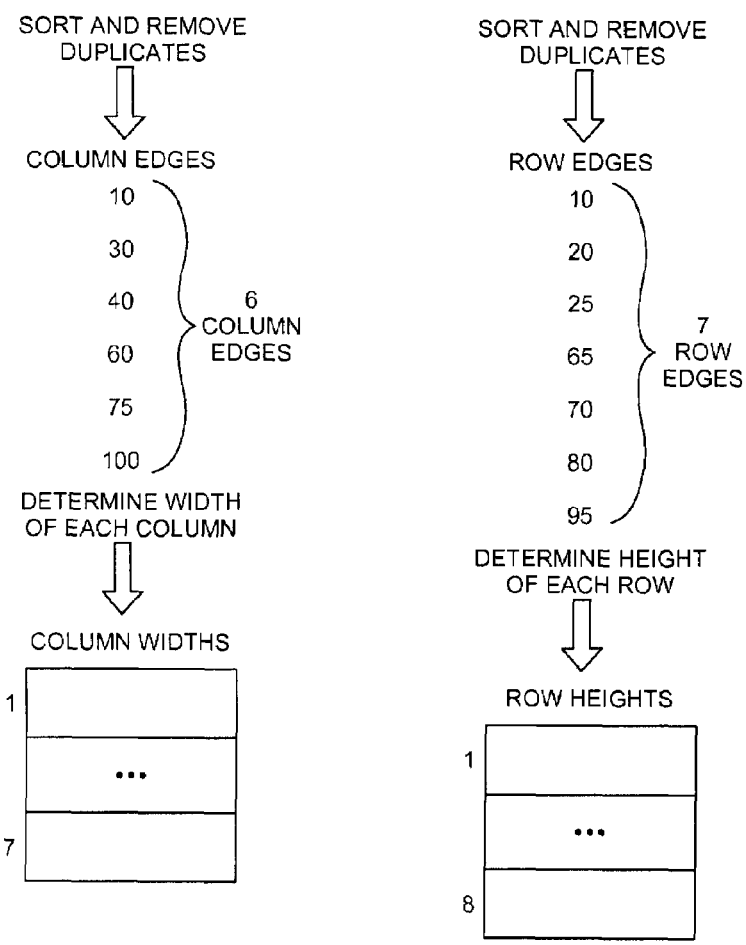
FIG. 23 is an example of second steps involved in determining an HTML table size.

FIG. 23 is an example of second steps involved in determining an HTML table size for a layout element. Once the column and row edges of the draw objects are determined, the edges are sorted, duplicate edges are removed from the sorted list, yielding unique row edges and unique column edges (steps 1904 and 1906 of FIG. 19). The unique rows edges and column edges are then counted. In the example, the objects have six column edges and seven row edges. Once the unique row edges and column edges are determined, the column widths and row heights for each column and row are determined.

Figure 24:
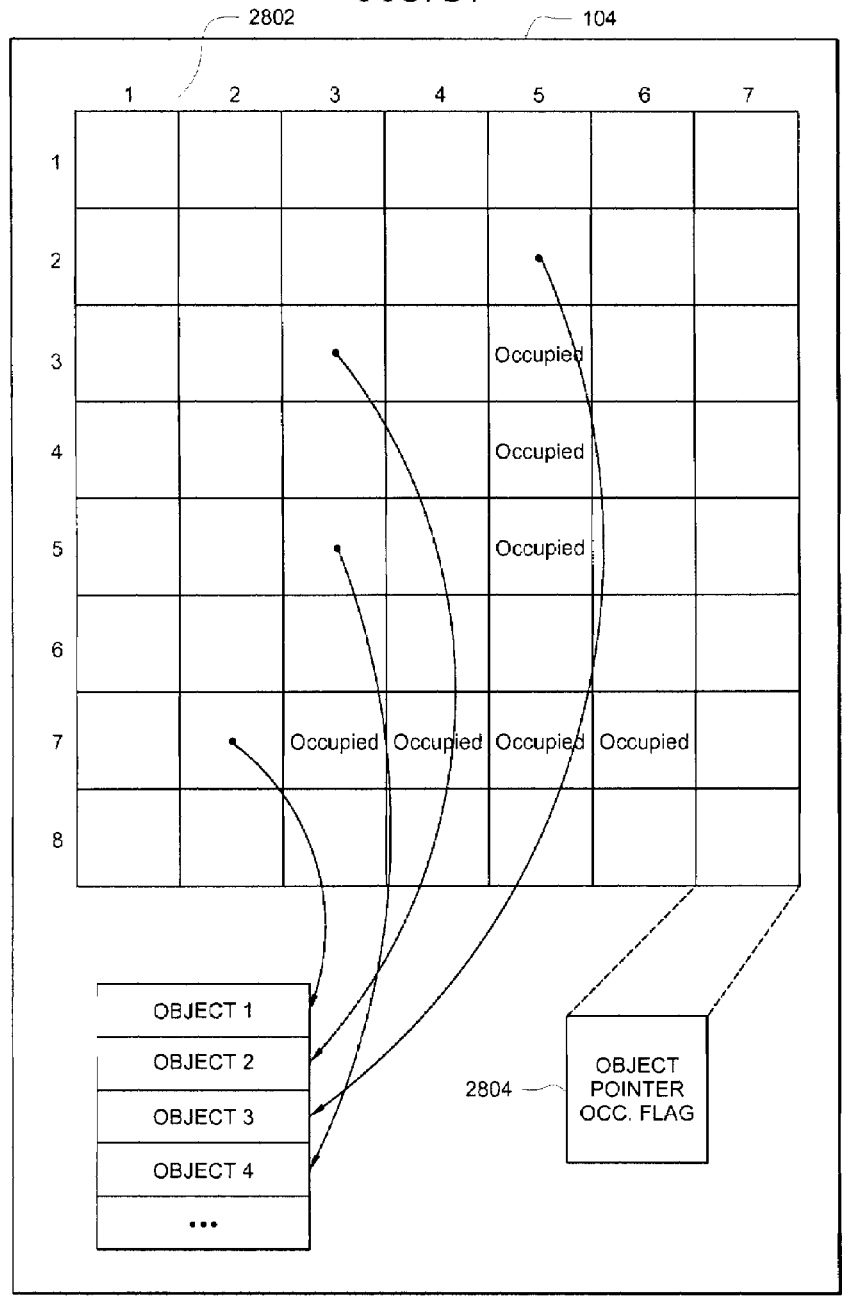
FIG. 24 is an example of a matrix generated by the steps of FIGS. 22 and 23.

FIG. 24 is an example of a matrix 2402 generated in accordance with the edges and draw objects. Matrix 2502 has a number of rows equal to the number of row edges plus one. The matrix has a number of columns equal to the number of column edges plus one. Thus, in the example, the matrix has seven columns and eight rows. Each element 2404 of the matrix has a pointer field and an occupied flag. The element of row 7, column 2 of the matrix points to object number 1 and is marked as occupied. The next four elements in row 2 are also marked as occupied. The element of row 3, column 3 points to object number 2 and is marked as occupied. The element of row 2, column 5 points to object number 3 and is marked as occupied. The next four elements in column 5 are also marked as occupied. The element of row 5, column 3 points to object number 4 and is marked as occupied.

Figure 25:
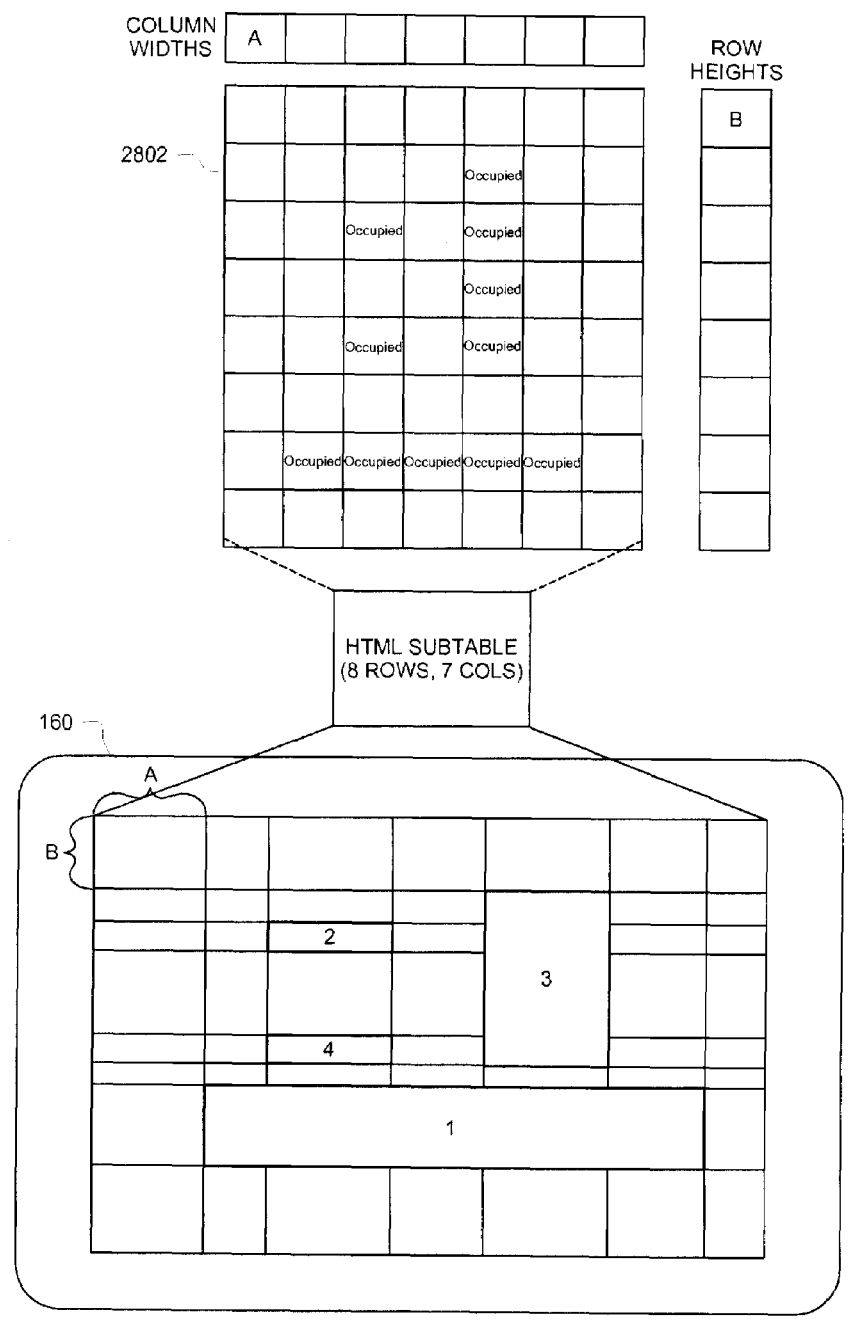
FIG. 25 is a block diagram of how the matrix of FIG. 24 is used to generate an HTML table.

FIG. 25 is a block diagram of how the matrix 2402 is used to generate an HTML table. The HTML table is used by a browser to display a portion of a page on display device 160 (such as a header, body, or a footer. (An alternate embodiment of the present invention creates a single table for each page of the site). Each element of the matrix is used to generate a cell in an HTML table (although some cells occupy more than one row or more than one column). For example, the matrix element in row 1, column 1 causes an empty table cell to be generated. Each row in the HTML table has a height in pixels that is equal to the height for that matrix row. Each cell in the HTML table has a width that is equal to the width of the matrix for that column.

As is known to persons of ordinary skill in the art, the cells in the table can be of varying sizes (i.e., can use the HTML tags "ROWSPAN" and COLSPAN"). The matrix element in row 2, column 5 causes generates of a cell that spans four rows (ROWSPAN=4). The matrix element in row 7, column 2 causes generation of a cell that spans five column (COLSPAN=5).

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for preserving a preferred presentation layout of a web page authored on a first computing system and rendered on one or more second computing systems, wherein, said layout is susceptible to influence by browser configuration on said one or more second computing systems, said method, comprising:
    obtaining a layout of display elements on a web page;
    determining, using a first computing system, a primary split direction for the web page, preserving a preferred layout of said web page when rendered by one or more second computing systems, wherein said preferred layout is susceptible to influence by browser configuration on said one or more second computing systems;
    determining splits of the web page, in the primary split direction;
    generating, after receiving a request from a user, an internal representation of the web page where the layout of the web page is primarily by rows or primarily by columns in accordance with the splits; and
    enabling the size of selected text of the web page to be locked.

2. The method of claim 1, where the step of determining the primary split direction includes the step of receiving input from a user indicating the primary split direction.

3. The method of claim 1, further comprising displaying the web page on a display screen, including indications of the locations in of the determined splits.

4. The method of claim 1, wherein the request received from a user is a publish request from a user.

5. The method of claim 1, wherein the request received from a user is a preview request from a user.

6. A system comprising:
    means for obtaining a layout of display elements on a web page;
    means for determining a primary split direction for the web page, said primary split direction preserving a preferred layout of said web page when rendered by web browsers hosted by at least one other system, wherein said preferred layout is susceptible to influence by browser configuration on said web browsers hosted by at least one other system;
    means for determining splits for the web page, in the primary split direction; and
    means for enabling the size of selected text of the web page to be locked.

7. A computer-readable storage medium storing program code for causing a computer to perform the steps of:
    obtaining a layout of display elements on a web page;
    determining a primary split direction for the web page, preserving a preferred layout of said web page when rendered by web browsers hosted by at least one other computer, wherein said preferred layout is susceptible to influence by browser configuration on said web browsers hosted by at least one other computer;
    determining splits in the web page, in the primary split direction, and
    enabling the size of selected text of the web page to be locked.

8. A system for preserving a preferred presentation layout of a web page authored on a first computing system and rendered on one or more second computing systems, wherein, said layout is susceptible to influence by browser configuration on said one or more second computing systems, said system comprising:
    a device for obtaining a layout of display elements on a web page, and a primary split direction for the web page preserving a preferred layout of said web page when rendered by various web browsers; and
    memory storing software code for determining splits in the web page, in the primary split direction and enabling the size of selected text of the web page to be locked.

9. The system of claim 8, wherein the primary split direction is set by the user.

10. The system of claim 8, wherein the primary split direction is a default setting.

11. The system of claim 8, wherein the primary split direction is either vertical or horizontal.

12. The system of claim 11, wherein, for a vertical primary split direction, the software code generates needed splits in a columnar orientation.

13. The system of claim 11, wherein, for a horizontal primary split direction, the software code generates needed splits in a row orientation.

14. The system of claim 8, wherein the software code displays the web page indicating the splits.

15. The system of claim 8, wherein the layout includes frames and wherein the software code determines splits for each frame independently.

16. A method for preserving a preferred presentation layout of a web page authored on a first computing system and rendered on one or more second computing systems, wherein, said layout is susceptible to influence by browser configuration on said one or more second computing systems, said method, comprising:

obtaining a layout of display elements on a web page;

determining, using a first computing system, a primary split direction for the web page, preserving a preferred layout of said web page when rendered by one or more second computing systems, wherein said preferred layout is susceptible to influence by browser configuration on said one or more second computing systems;

determining splits of the web page, in the primary split direction; and enabling the size of selected text of the web page to be locked.

17. The method of claim 16, where the step of determining the primary split direction includes the step of receiving input from a user indicating the primary split direction.

18. The method of claim 16, further comprising displaying the web page on a display screen, including indications of the locations in of the determined splits.

19. The method of claim 16, further comprising generating an internal representation of the web page where the layout of the web page is primarily by rows or primarily by columns in accordance with the splits.

20. The method of claim 19, wherein the generating step is performed after receiving a publish request from a user.

21. The method of claim 19, wherein the generating step is performed after receiving a preview request from a user.

* * * * *

UNITED STATES PATENT AND TRADEMARK OFFICE
CERTIFICATE OF CORRECTION

| | | |
|---|---|---|
| PATENT NO. | : 7,278,098 B1 | Page 1 of 1 |
| APPLICATION NO. | : 08/827634 | |
| DATED | : October 2, 2007 | |
| INVENTOR(S) | : Steven R. Boye et al. | |

It is certified that error appears in the above-identified patent and that said Letters Patent is hereby corrected as shown below:

On the cover page:

Item 75, Inventors names (left hand column), delete the portion reading "Escobosa" and insert --Escabosa--.

Signed and Sealed this

Twenty-seventh Day of November, 2007

JON W. DUDAS
*Director of the United States Patent and Trademark Office*